United States Patent
Matsumura

(10) Patent No.: US 7,266,158 B2
(45) Date of Patent: Sep. 4, 2007

(54) RADIO COMMUNICATION EQUIPMENT AND METHOD FOR CONTROLLING SAME

(75) Inventor: Kazuhiro Matsumura, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 855 days.

(21) Appl. No.: 10/441,026

(22) Filed: May 20, 2003

(65) Prior Publication Data

US 2004/0042541 A1    Mar. 4, 2004

(30) Foreign Application Priority Data

May 20, 2002    (JP)    ............................. 2002-144651

(51) Int. Cl.
*H04L 27/00*    (2006.01)
(52) U.S. Cl. ...................................... 375/295; 375/316
(58) Field of Classification Search ................ 375/295, 375/316, 354, 355, 356
See application file for complete search history.

(56) References Cited

U.S. PATENT DOCUMENTS

| | | | |
|---|---|---|---|
| 5,613,235 A * | 3/1997 | Kivari et al. ................ | 455/574 |
| 5,740,129 A * | 4/1998 | Frampton .................... | 368/10 |
| 5,815,819 A * | 9/1998 | Ohta et al. .................. | 455/574 |
| 6,044,282 A * | 3/2000 | Hlasny ........................ | 455/574 |
| 6,192,479 B1 * | 2/2001 | Ko ............................. | 713/300 |
| 6,311,081 B1 * | 10/2001 | Northcutt et al. ........... | 455/574 |
| 6,615,060 B1 | 9/2003 | Usui | |

FOREIGN PATENT DOCUMENTS

| | | |
|---|---|---|
| CN | 1215266 A | 4/1999 |
| CN | 1265556 A | 9/2000 |
| GB | 2 329 795 A | 3/1999 |
| JP | 2001-345732 A | 12/2001 |

* cited by examiner

*Primary Examiner*—Chieh M. Fan
*Assistant Examiner*—Jason M. Perilla
(74) *Attorney, Agent, or Firm*—Birch, Stewart, Kolasch & Birch, LLP

(57) ABSTRACT

A radio communication equipment is provided with a clock generating section which generate an operation clock signal for a communication permitting period in which communication with an external device is permitted by carrying data over electric wave and a power-down clock signal for non-communication period respectively based on control signals. A high-speed counter is provided for counting an operation clock signal for controlling the communication permitting period. A low-speed slot counter is provided for counting a power-down clock signal for controlling the non-communication period. A clock control section is provided for outputting the count value of the high speed counter and the count value of the low speed counter, and continues to count a count value between the high speed slot counter and the low speed counter.

18 Claims, 13 Drawing Sheets

RADIO COMMUNICATION EQUIPMENT AND METHOD FOR CONTROLLING SAME

This nonprovisional application claims priority under 35 U.S.C. §119(a) on patent application Ser. No(s). 2002-144651 filed in JAPAN on May 20, 2002, which is (are) herein incorporated by reference.

FIELD OF THE INVENTION

The present invention relates to a radio communication equipment which permits a reduction in power consumption and a method for controlling such communication equipment.

BACKGROUND OF THE INVENTION

In frequency hopping type spread spectrum radio communication equipment, generally, a clock mainly used in an RF circuit section has significantly different frequency from that of a clock generally used in other base band processing circuits or a central processing unit (hereinafter generally referred to as CPU). For the RF circuit section, a high frequency RF clock signal is used. On the other hand, for the circuit section other than the RF circuit including a base band processing circuit, and a section for respective circuits of the CPU, an operation clock signal having lower frequency than the RF clock signal is used. This means that in the RF circuit section to be driven by a RF clock signal having higher frequency, more current is consumed than other circuit section.

In view of the foregoing, in order to suppress an overall current consumption of the entire circuit, the radio communication equipment is generally arranged such that a high frequency RF clock signal generated by an RF clock generating device is supplied only to the RF circuit section, and an operation clock signal having a frequency not as high as the RF clock signal, which is either obtained by dividing the frequency of the RF clock frequency generated by the RF clock generating device or generated by another operation clock generating device is supplied to the circuit section other than the RF circuit section.

Along with the rapid popularization of a battery-driven portable radio communication equipment, a method of periodically carrying out transmission and receiving and stopping the operation of the clock generating device in the period in which the transmission and receiving is not carried out is generally adopted in order to reduce the power consumption.

For example, Japanese Unexamined Patent Application Tokukai No. 2001-345732 (published on Dec. 14, 2001) discloses the structure wherein while an RF circuit section is being operated for transmitting and receiving, modulation and demodulation processes are carried out in a base band processing circuit by supplying a high speed clock signal from the side of the RF circuit; on the other hand, while transmission/receiving is not being carried out, it is waited for the next transmission/receiving start timing set by the timer section which receives a clock signal from a low speed clock generating circuit placed in other part than the RF circuit section. With this structure, the power consumption can be reduced in the state where the transmission and receiving is not being carried out by stopping the supply of a high speed clock to other sections than the timer section in the stand-by state.

According to the foregoing technique, the radio communication equipment can be arranged such that while the transmission and receiving is not being performed, only a timer section, a CPU, a memory, and a display device are operated, and operations in the base band processing circuit section other than the RF circuit section and the timer section are stopped, thereby reducing power consumption.

However, the foregoing conventional structure of reducing power consumption by performing transmission and receiving operations periodically, and stopping the supply of clocks to the RF circuit section and the most part of the base band processing circuit section while transmission and receiving operations are not being performed has the following problem. In the foregoing conventional technique, clocks are deviated between the transmitting side and the receiving side, or the clock is adjusted for the deviation, which may also lead to a shift in the next transmission/receiving restart timing to be waited by the timer section.

Further, the foregoing conventional technique merely enables a reduction in power consumption while transmission and receiving is not being performed by periodically carrying out transmission/receiving operations, and does not permit delicate adjustments, which can be effective for reducing the power consumption. Specifically, according to the foregoing technique, it is not possible to adjust the period of supplying a high speed clock according to an amount of data without disturbing the data communication, for example, when data communication is not performed in the transmission and receiving period, the supply of the high speed clock is stopped till the next transmission; on the other hand, when data communication has not been completed in the transmission/receiving period, the period of supplying the high speed clock is extended for a predetermined so that communication of all the data can be completed.

In the conventional technique, the operation of the CPU section which consumes more power as well as the RF circuit section and the base band processing circuit section is not stopped.

SUMMARY OF THE INVENTION

It is an object of the present invention to provide (i) a radio communication equipment which ensures an accurate counting without a problem of a shift in restarting timing for the next transmission/receiving operations even when a difference in clock occurs between the transmitting side and the receiving side or the clock is adjusted to an appropriate clock for the difference, and to provide a method for controlling the radio communication equipment.

It is another object of the present invention to provide a radio communication equipment that attains subtle control in communication in which stable communication is realized without deteriorating data communication, and at the same time power consumption is reduced in accordance with an amount of the communication, and (ii) a method for controlling the radio communication equipment.

It is still another object of the present invention to provide a radio communication equipment capable of stopping not only an operation of an RF circuit part and a baseband processing circuit part, but also an operation of a CPU part, which has a large power consumption.

In order to solve the forging problems, a radio communication equipment of the present invention is provided with a radio signal transmission/receiving section (RF circuit part) for communicating with an external device by carrying data over radio waves; a modulation/demodulation section (baseband processing circuit part), connected to the radio signal transmission/receiving section (RF circuit part), for modulating a transmitting signal and demodulating a receiving signal; a clock generating section for generating an RF clock signal, an operation clock signal, and a power-down clock signal respectively in accordance with a control signal, (i) the RF clock signal having a high frequency and serving as reference for driving the radio signal transmission/receiving section, (ii) the operation clock signal being for normal operation and serving as reference for driving each section except the radio signal transmission/receiving section, and (iii) the power-down clock signal having a low frequency being for reducing power consumption; a period count section, including a high speed slot counter and a low speed slot counter, for counting slots corresponding to duration of a period for transmission and receiving, the high speed slot counter driven in accordance with the operation clock signal thus generated by the clock generating section, and the low speed slot counter driven in accordance with the power down clock signal having the low frequency and being thus generated by the clock generating section; a request signal generating section for receiving a count value of the slots counted by the high speed slot counter and a count value of the slots counted by the low speed slot counter, and for outputting a request signal (a) when the count value counted by the high speed slot counter reaches a predetermined value and (b) when the count value counted by the low speed slot counter reaches the predetermined value; and a clock control section for outputting the control signal in accordance with the request signal.

In the above arrangement, the RF clock signal having the high frequency and being generated by the clock generating section is supplied to the radio signal transmission/receiving section (RF circuit part) and the operation clock signal for normal operation is supplied to each section except the radio signal transmission/receiving section (RF circuit part). The present invention may be so arranged that the operation clock for normal operation is generated by subjecting a clock for RF to frequency division.

In the arrangement, each clock signal is controlled by the clock controlling section. With this arrangement, in case where the transmission and receiving are carried out only in a certain transmission and receiving period every predetermined number of cycles, it is possible to stop supplying the RF clock signal and the operation clock signal during the period in which no transmission and receiving are carried out.

The radio signal transmission/receiving section (RF circuit part) transmits and receives a signal to/from an external device via radio waves, based on the RF clock signal.

In case where the transmission and receiving are carried out only in a certain transmission and receiving period every predetermined number of cycles, the radio signal transmission/receiving section (RF circuit part) can stop operating in the period in which no transmission and receiving are carried out.

The modulation/demodulation section (baseband processing circuit part) modulates a transmitting signal and demodulates a receiving signal (that is modulates a signal to be transmitted and demodulates a signal thus received).

In case where the transmission and receiving are carried out only in a certain transmission and receiving period every predetermined number of cycles, blocking of the operation clock signal can stop operation of the modulation/demodulation section (baseband processing circuit part) in the period, in which no transmission and receiving are carried out.

The period count section, which is provided with a high speed slot counter and a low speed slot counter, counts slots corresponding to duration of a period for transmission and receiving, the high speed slot counter driven in accordance with the operation clock signal thus generated by the clock generating section, and the low speed slot counter driven in accordance with the power down clock signal having the low frequency and being thus generated by the clock generating section.

In case where the transmission and receiving are carried out only in a certain transmission and receiving period every predetermined number of cycles, the high speed slot counter counts the slots in the period in which the transmission and receiving are carried out, and stops operating in the period in which no transmission and receiving are carried out.

Moreover, it is preferable that the low speed slot counter continues the count values counted by the high speed slot counter when the high speed slot counter stops operating, and continues the counting. In this case, the present invention may be so arranged that each section except the low speed slot counter stops operating in the period in which no transmission and receiving are carried out, so as to be in a stand-by state.

In shifting from (i) the period in which the transmission and receiving are carried out, to (ii) the period in which no transmission and receiving are carried out, and in shifting from (iii) the period in which no transmission and receiving are carried out, to (iv) the period in which the transmission and receiving are carried out, the radio communication equipment generates the request signal representative of each timing of the shifting.

Moreover, the present invention may be so arranged that the period count section is provided with a communication slot counter for counting slots in a period in which the transmission and receiving are carried out. In this case, by setting, in the period count section, (i) a number of slots representing duration of a cycle, (ii) a number of slots representing the period (transmission and receiving period) in which the transmission and receiving are carried out, and (iii) a number of slots representing duration by which the transmission and receiving period is extended in case data communication is carried out in the transmission and receiving period, it is possible to carry on the data communication by extending the transmission and receiving period, in case the data communication is continued since the transmission and receiving period. Thus, it is possible to realize an arrangement which attains subtle control for reducing power consumption depending on an amount of communication, without deteriorating data communication.

On the other hand, it is also possible to arranged such that the predetermined cycle including the transmission and receiving period and the non-transmission and receiving period is kept constant even if the transmission and receiving period is continued until a next timing at which the transmission and receiving are resumed.

Moreover, it is preferable that the radio communication equipment includes a circuit for storing an expected current time expected from the lastly reproduced current time. By including such circuit in the radio communication equipment, it is possible to compare the expected time with current time detected from the receiving signal. Hereby, it is possible to detect shifting of a timing a clock at the receiving side from a timing of the clock at the transmission side due to condition in which radio communication is carried out, or correcting of the clock in terms of such shifting in timing. Therefore, by correcting the count value of the period count section to a correct value each time correction is needed, it is possible to accurately count without shifting the next timing at which the transmission and receiving are resumed.

Moreover, the radio communication equipment is capable of automatically operating in accordance with setting which enables such subtle control as to reduce the power consumption, even in case the transmission and receiving are carried out only in a certain transmission and receiving period every predetermined number of cycles. Thus, it is only necessary that data for setting should be received from the CPU part for controlling the whole circuit of the radio communication equipment.

Therefore, in case of an arrangement including the CPU part for controlling the whole circuit, it is possible to stop even operation of the CPU part in the non-transmission and receiving period, by using as an input to the clock control section, the request signal representative of a timing of transferring from the transmission and receiving period to the non-transmission and receiving period or a timing of transferring from the non-transmission and receiving period to the transmission and receiving period, the request signal generated by the present device.

In order to attain the foregoing objects, a method of the present invention for controlling a radio communication equipment, includes: process of transmitting and receiving a radio signal by communicating with an external device via radio waves representing data; process of modulating the radio signal before the transmitting and demodulating the radio signal after the receiving; process of performing clock control for stopping supplying an RF clock signal, an operation clock signal, and a power-down clock signal during a period in which no transmission and receiving are carried out; and the process of counting slots in communication, including. (a) the process of counting slots at a high speed in accordance with the operation clock signal and (b) the process of counting at a low speed in accordance with the power-down clock signal.

In the process of transmitting and receiving a radio signal, the signal is transmitted and received to/from the external device in accordance with the RF clock signal. With the process of transmitting and receiving a radio signal, it is possible to stop the operation in the period in which no transmission and receiving are carried out, in case where the transmission and receiving are carried out only in a certain transmission and receiving period every predetermined number of cycles.

In the process of performing the clock control, each clock signal is controlled. Hereby, it is possible to stop the supply of the RF clock signal and the operation clock signal in the period in which no transmission and receiving are carried out, in case where the transmission and receiving are carried out only in a certain transmission and receiving period every predetermined number of cycles. The present invention may be so arranged that the power-down clock signal is surely supplied in the period in which no transmission and receiving are carried out, meanwhile the power-down clock signal is not supplied, in the period in which the transmission and receiving are carried out.

In the process (baseband processing process) of modulating the radio signal before the transmitting and demodulating the radio signal after the receiving, the radio signal to be transmitted (a transmitting signal) is modulated and the radio signal received (receiving signal), the radio signal is demodulated. With the process (baseband processing process) of modulating and demodulating, it is possible to stop the operation in the period in which no transmission and receiving are carried out, in case where the transmission and receiving are carried out only in a certain transmission and receiving period every predetermined number of cycles.

The process of performing period counting, in order to count slots in communication includes the (a) process of counting slots at a high speed in accordance with the operation clock signal, and the (b) process of counting at a low speed in accordance with the power-down clock signal.

In the process of counting the slots at the high speed, in case the transmission and receiving are carried out only in a certain transmission and receiving period every predetermined number of cycles, it is possible to count the slots in communication in the period in which the transmission and receiving are carried out, meanwhile, it is possible to stop the operation in the period in which no transmission and receiving are carried out.

Moreover, in the process of counting the slots at the low speed, it is possible to continues the count values counted in the process of counting the slots at the high speed when the process of counting the slots at the high speed stops, so as to continue the counting of the slots performed in the process of counting the slots at the high speed.

In this case, the present invention may be arranged such that each process except the process of counting the slots at the low speed is stopped in the period in which no transmission and receiving are carried out, thereby keeping, in the stand-by state, each process except the process of counting the slots at the low speed.

The method for controlling the radio communication equipment of the present invention may be so arranged as to include process of generating, in accordance with the count value counted in the process of counting the slots, a request signal representative of each timing of shifting from (i) the period in which the transmission and (a) receiving are carried out, to (ii) the period in which no transmission and receiving are carried out, and (b) shifting from (iii) the period in which no transmission and receiving are carried out, to (iv) the period in which the transmission and receiving are carried out.

Moreover, the present invention may be so arranged that the process of performing period count includes process of counting slots in communication in the period the transmission and receiving are carried out.

In this case, it is possible to set, in the process of performing period count, (i) a number of slots representing duration of a cycle, (ii) a number of slots representing the period in which the transmission and receiving are carried out, and (iii) a number of slots representing duration by which the transmission and receiving period is extended in case data communication is carried out in the transmission and receiving period.

By having each setting, even in case the transmission and receiving are carried out only in a certain transmission and receiving period every predetermined number of cycles, it is possible to carry on the data communication by extending the transmission and receiving period, in case the data communication is continued since the transmission and receiving period. Thus, it is possible to realize an arrangement which attains subtle control for reducing power consumption depending on an amount of communication, without deteriorating data communication.

On the other hand, it is also possible to arranged such that the predetermined cycle including the transmission and receiving period and the non-transmission and receiving period is kept constant even if the transmission and receiving period is continued until a next timing at which the transmission and receiving are resumed.

Moreover, by including such process of internally holding expected current time expected from the lastly reproduced current time, it is possible to compare the expected current time with current time obtained from the received signal. Hereby, it is possible to detect shifting of a timing a clock at the receiving side from a timing of the clock at the transmission side due to condition in which radio communication is carried out, or correcting of the clock in terms of such shifting in timing. Therefore, by correcting, to a correct value, the count value in the process of performing period count each time correction is needed, it is possible to accurately count without shifting the next timing at which the transmission and receiving are resumed.

Moreover, in the method for controlling the radio communication equipment, it is possible to automatically operate in accordance with setting which enables such subtle control as to reduce the power consumption, even in case the transmission and receiving are carried out only in a certain transmission and receiving period every predetermined number of cycles. Thus, it is only necessary that data for setting should be received from the CPU part for controlling the entire circuit of the radio communication equipment.

Therefore, in case of an arrangement including the process in the CPU part for controlling the whole circuit, it is possible to stop even the process in the CPU part in the non-transmission and receiving period, by using as an input to the process of controlling the clock, an output of the process of generating the request signal representative of a timing of transferring from the transmission and receiving period to the non-transmission and receiving period or a timing of transferring from the non-transmission and receiving period to the transmission and receiving period, the process of generating the request signal included in the present process.

Furthermore, in order to attain the forgoing objects, a radio communication equipment of the present invention is provided with a clock generating section for generating, respectively in accordance with a control signal, a first clock signal for the communication-permitting period, and a second clock signal for non-communication period; a first counter for counting the first clock signal, for the control of the communication-permitting period; a second counter for counting the second clock signal, for control of the non-communication period; and a clock control section for outputting the control signal in accordance with a count value of the first counter and a count value of the second counter, and causing the first counter and the second counter to count the count values continuously.

With the above arrangement, the counting is so carried out that the count value is continues between the first counter and the second counter, even if the communication permitting period, which is controlled by the first counter, is changed according to needs, that is, extended or shortened. Thus, it is possible to smoothly perform transfer between the communication permitting period (in which the communication is possible) and the non-communication period (in which the communication is not carried out), thereby ensuring the setting in both the periods. With this arrangement, it is possible to surely reduce the power consumption during the non-communication period.

For a fuller understanding of the nature and advantages of the invention, reference should be made to the ensuing detailed description taken in conjunction with the accompanying drawings.

DESCRIPTION OF THE EMBODIMENTS

The following descriptions will explain radio communication equipment and the control method in accordance with respective embodiments of the present invention in reference to FIG. 1 to FIG. 13.

First Embodiment

Figure 1:
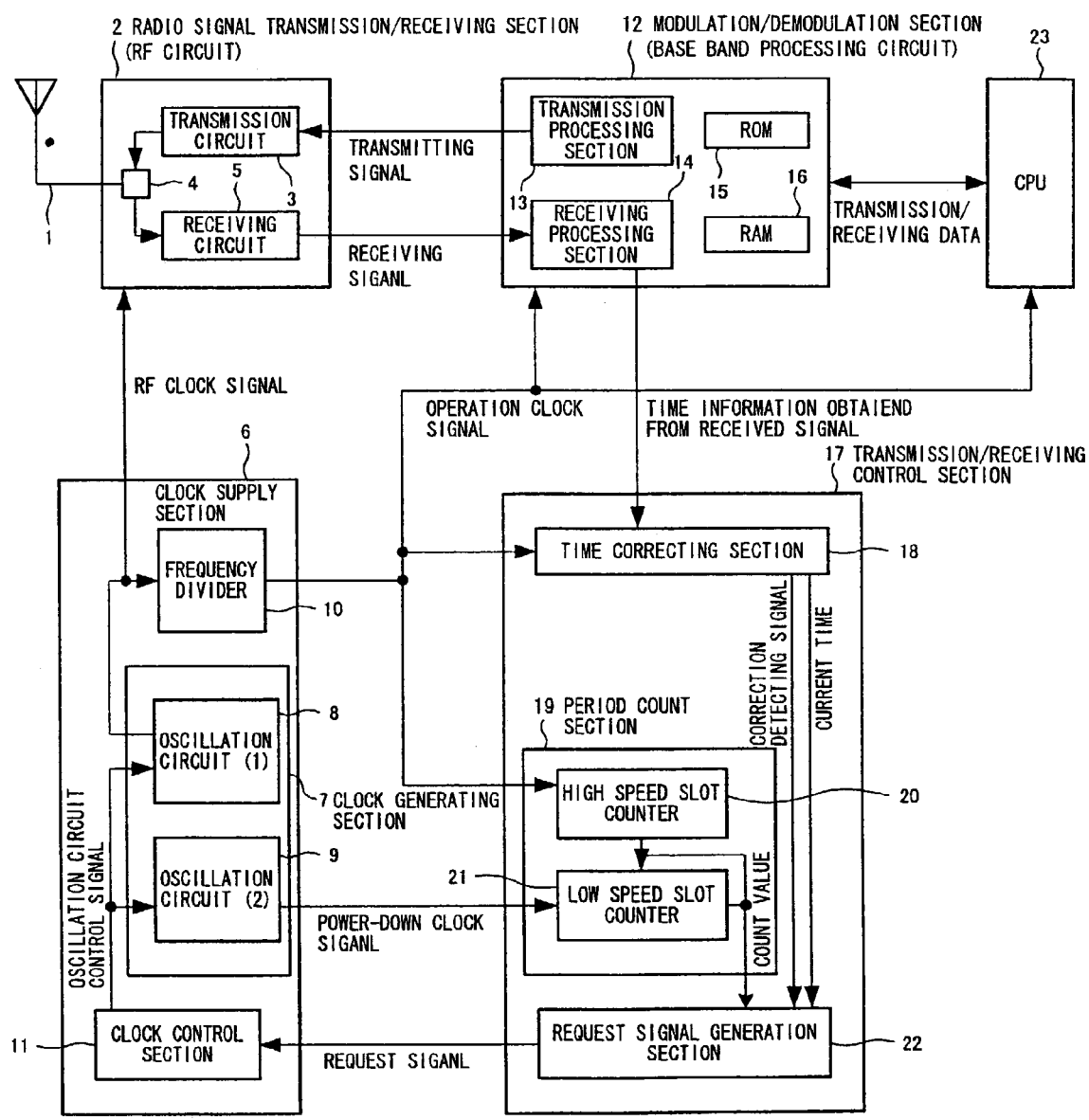
FIG. 1 is a block diagram for explaining schematic structures of a radio communication equipment in accordance with one embodiment.

As illustrated in the block diagram of FIG. 1, a radio communication equipment in accordance with one embodiment of the present invention includes: an antenna 1, a radio signal transmitting/receiving section (RF circuit) 2, a clock supply section 6, a modulation/demodulation section (base band processing section) 12, a transmission/receiving control section 17 and a CPU 23 which controls the radio communication equipment as a whole.

The communication system for the communication radio communication equipment is not particularly limited as long as a communication period in which communication of data with an external device is permitted by carrying data over radio waves and a non-communication period provided separately from the communication period are set alternately (time division system, for example). For example, the frequency hopping type spectrum dispersion system in which a frequency is subjected to vary within a predetermined frequency range, for example, in a unit of 1 MHz (for example, 79 MHz) at every slot period (for example, 625 µ sec) (such communication protocols as bluetooth (registered mark), radio Ethernet (registered mark), PHS communication, etc.).

The antenna 1 is provided for transmitting/receiving data with an external device based on a radio signal. The clock supply section 6 includes an oscillating circuit (1)8, an oscillating circuit (2)9, a frequency divider 10 and a clock control section 11. The clock supply section 6 is provided for supplying an RF clock signal (first clock signal), an operation clock signal (first clock signal), and a power down clock signal (second clock signal) respectively.

The oscillation frequency (1)8 is provided for generating an RF clock signal having the highest frequency and an operation clock signal whose frequency is lower than the RF clock signal. The oscillation circuit (2)9 is provided for generating a power down clock signal having a lower frequency than the operation clock signal.

Figure 2:
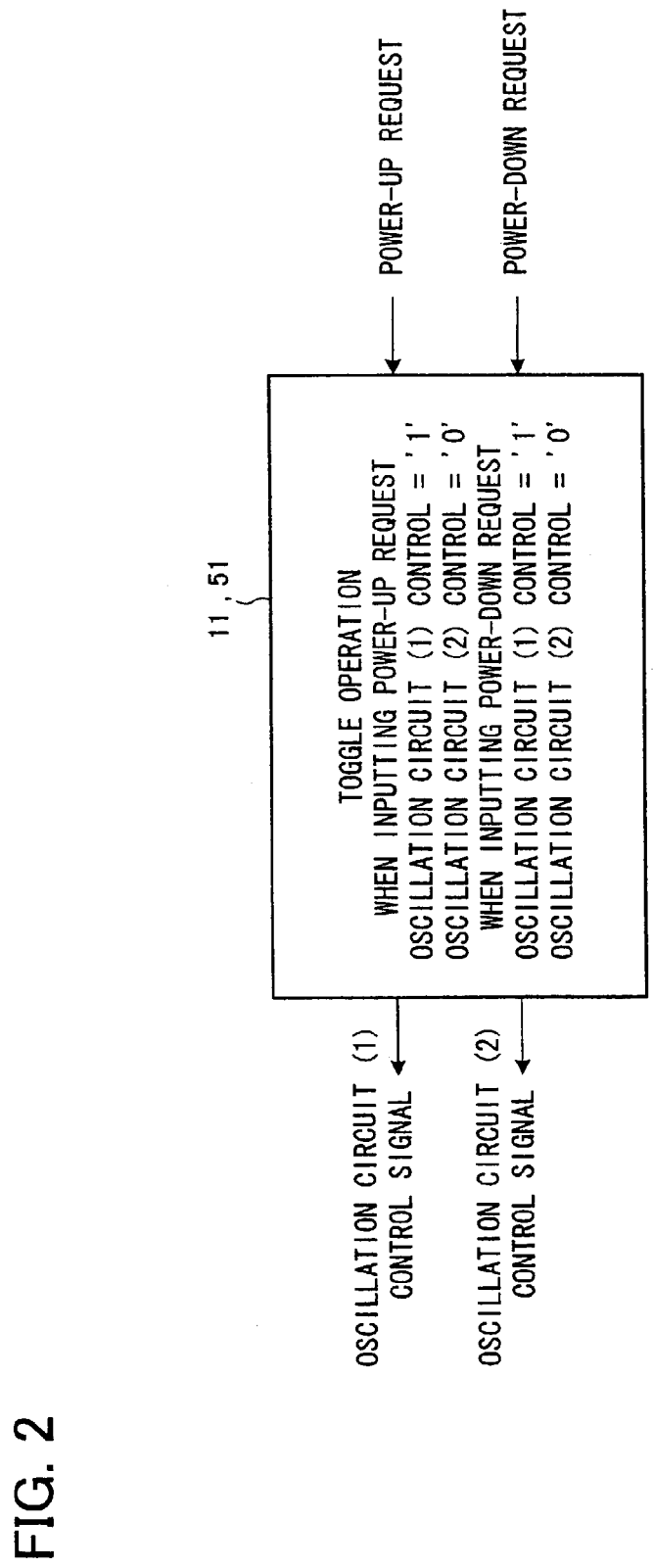
FIG. 2 is an explanatory view which explains operations in a clock control section of the radio communication equipment.

The clock control section 11 is provided for outputting respective control signals for controlling an output of each clock signal based on a request signal from a request signal generating section 22. As illustrated in FIG. 2, the clock control section 11 is arranged so as to perform a toggle (alternately switched ON/OFF, i.e., exclusively) such that the oscillating circuit (1)8 and the oscillating circuit (2)9 perform a toggle operation mutually based on a power-up request signal or a power down request signal as a request signal.

The clock control section 11 is provided for outputting a control signal for controlling an output of each clock signal based on a request signal from the request signal generating section 22. As illustrated in FIG. 2, the operation of the clock control section 11 is set such that when inputting a power-up request, the control signal to the oscillating circuit (1)8 and the control signal to the oscillating circuit (1)8 are set to "0", and "1" respectively.

As illustrated in FIG. 1, the RF clock signal is a signal generated from the oscillation circuit (1)8. The operation clock signal is a lower frequency signal obtained by dividing the frequency of the RF clock signal generated from the oscillating circuit (1)8 by a frequency divider 10. A power down clock signal is a signal generated by the oscillating circuit (2)9.

A radio signal transmission/receiving section 2 is constituted by a transmission circuit 3, a receiving circuit 5, and an antenna switch 4, and a radio signal process is performed by the transmission circuit 3 and the receiving circuit 5 by switching between transmission and receiving by the antenna switch 4.

The modulation/demodulation circuit 12 is mainly constituted by a transmission processing section 13, a receiving processing section 14, a ROM 15 and a RAM 16, etc. The modulation/demodulation circuit 12 modulates a receiving signal from the radio signal transmission/receiving section 2 into receiving data by the receiving processing section 14 based on the operation clock signal, or demodulates the transmission data into a transmission signal to the radio signal transmission/receiving section 2 by the transmission processing section 13. Although the modulation/demodulation system of the present invention is not particularly limited, and, for example, the binary or quadrate frequency modulation system may be adopted.

The transmission/receiving control section 17 includes a time correcting section 18, a frequency counter section 19 and a request signal generating section 22. The time correcting section 18 is set so as to hold the time data obtained from the receiving section by the receiving processing section 14.

Figure 3:
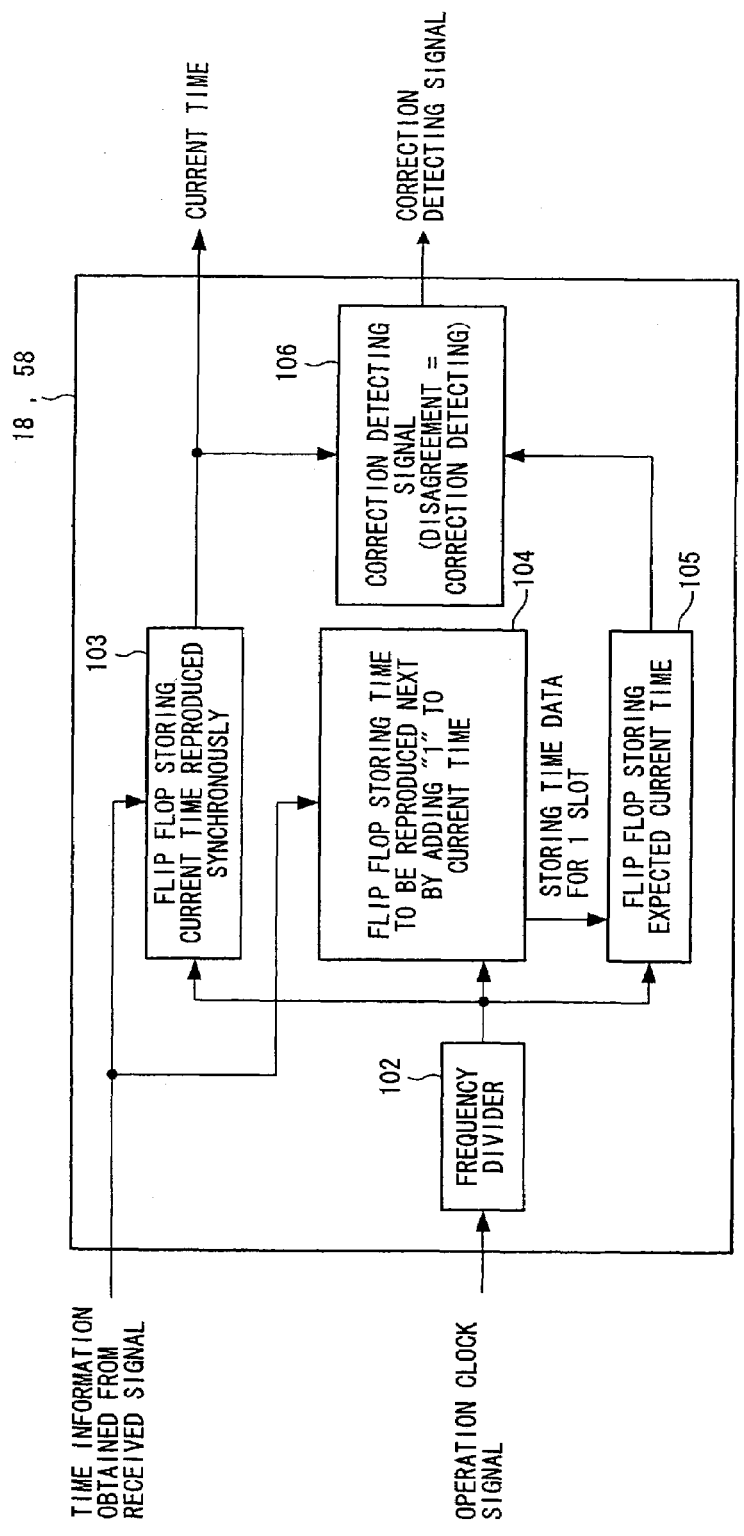
FIG. 3 is a block diagram, which explains the schematic structure in a time correcting section of the radio communication equipment.

As illustrated in FIG. 3, the time correcting section 18 includes a frequency divider 102 for dividing the frequency of the operation clock signal by a slot width, a flip flop 103 for storing current time synchronously reproduced, a flip flop 104 for storing time to be reproduced next, a flip flop 105 for temporarily storing time to be reproduced next for a predetermined time, say 1 slot and storing the expected current time; and a correction detecting section 106 for detecting if a time correction is applied.

The time information obtained from the received signal is stored in the flip flop 103 as current time to be synchronously reproduced. In the meantime, "the time to be reproduced next" is stored in the flip flop 104, which is obtained by adding "1" (for example, time for one slot) to the current time synchronously reproduced.

The flip flop 105 stores a value obtained by delaying a value of the flip flop 104 by one slot. This means that the flip flop 105 stores the time to be reproduced next as calculated in the previous slot, i.e., the expected current time.

Then, the current time stored in the flip flop 103 and synchronously reproduced therefrom is compared with the expected current time stored in the flip flop 105, and a correction detecting signal is output. As a result of comparison, if the current time reproduced from the flip flop 103 does not coincide with the current time stored in the flip flop 105, indicating that the time data is not continuous, it can be detected that the time correction is performed. From the time correction section 18, the current time and the correction detecting signal can be output.

In FIG. 1, the frequency counter section 19 counts down the number of slots based on a signal obtained by dividing the frequency of the operation clock signal by the high speed slot counter (first counter) 20 while the operation clock signal is being supplied, and counts down the number of slots based on a power down clock signal by the low speed slot counter (second counter) 21 continuing count value of the high-speed slot counter 20 when the supply of the operation clock signal is terminated.

The high speed slot counter 20 stores a frequency dividing circuit for dividing the frequency of the operation clock, and the resulting divided frequency of the clock is basically set to the same frequency as the frequency of the power down clock (one slot period).

Figure 4:
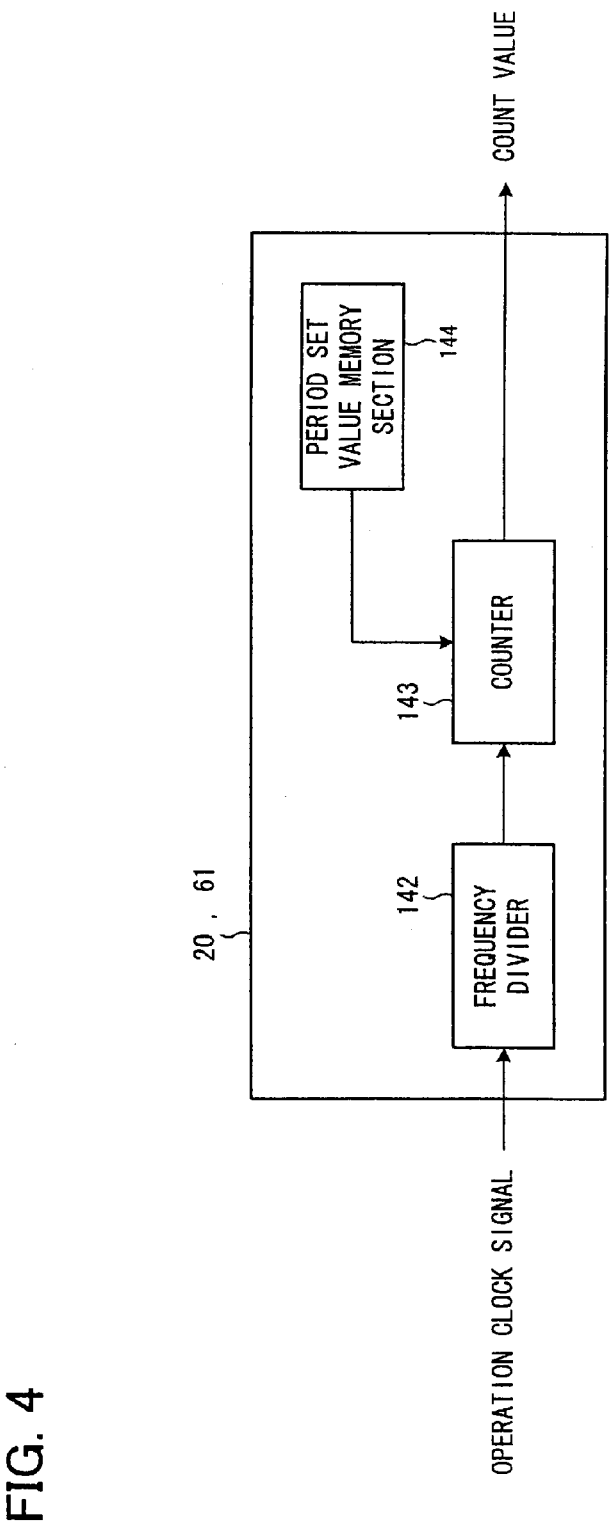
FIG. 4 is a block diagram, which explains the schematic structure of a high speed slot counter of the radio communication equipment.
Figure 5:
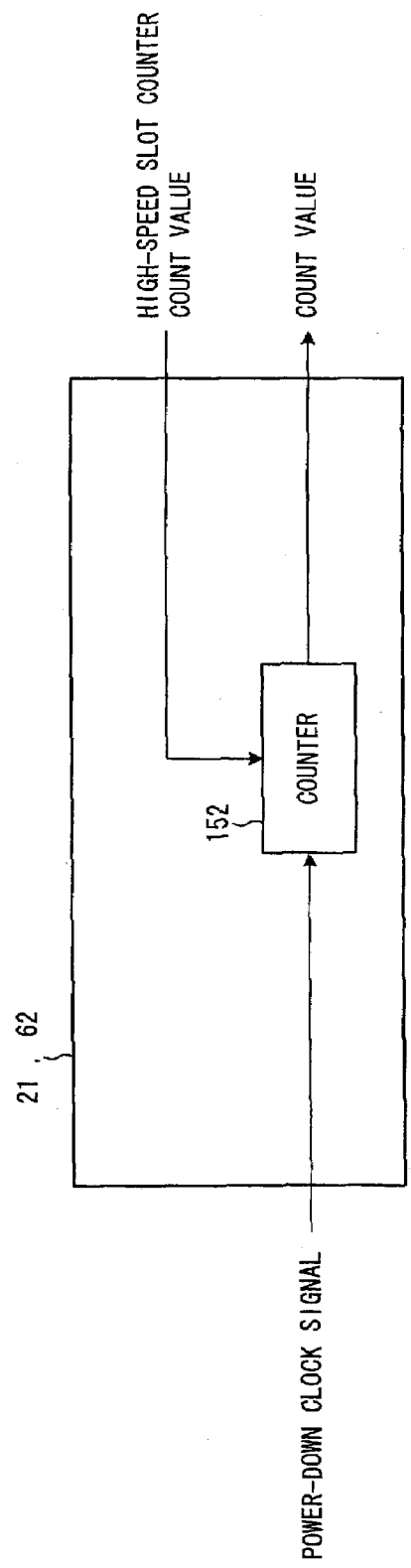
FIG. 5 is a block diagram which explains the schematic structure of a low speed slot counter of the radio communication equipment.

FIG. 4 shows the structure of the high speed slot counter 20, and FIG. 5 shows the structure of the low speed slot counter 21, respectively. In FIG. 4, the high speed slot counter 20 is constituted by a frequency divider 142, a counter 143 and a period set value memory section 144, and starts the operation based on a frequency set value stored in the period set value memory section 144 as an initial value.

In FIG. 5, the low speed slot counter 21 is constituted by the counter 152, and starts an operation based on a count value as output from the high speed counter 20 as an initial value. The explanation of the respective structures of the counter 143 and the counter 152 has been given through the case of the counter which counts down; however, the present invention is not intended to be limited to this, and a counter which counts up may be equally adopted.

Figure 6:
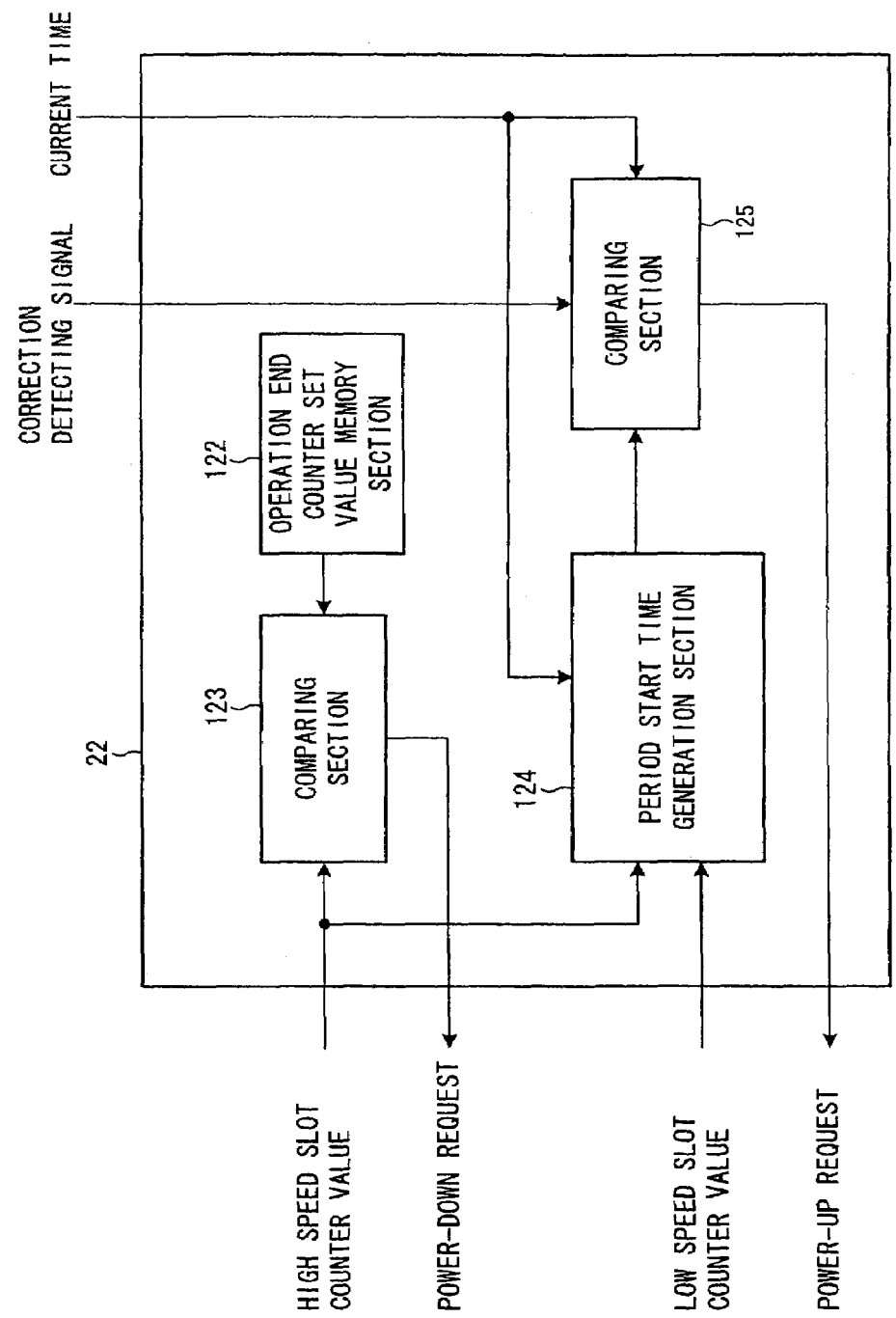
FIG. 6 is a block diagram which explains the schematic structure of a request signal generating section in the radio communication equipment.

In FIG. 1, the request signal generation section 22 supplies a request signal to the clock control section 11 based on the counter value of the synchronous counter section 19. As illustrated in FIG. 6, the request signal generation section 22 is constituted by comparison sections 123 and 125, a period start time generation section 124 and an operation end counter set value memory section 122.

The comparison section 123 compares a high speed slot counter value and an operation completion counter set value as stored in the operation end counter set value memory section 122, and outputs a power down request when the high speed slot counter value coincide with the operation completion counter set value.

On the other hand, the period start time generating section 124 stores therein an adder, and calculates a period start time by adding the high speed slot counter value in the operation state, low speed slot counter value in the stand-by state, and the current time.

The comparison section 125 compares the period start time as generated in the period start time generating section 124 with the current time, and outputs a power-up request as a request signal when the period start time coincides with the current time.

In the event that the correction detection signal is input, the period start time may not coincides with the current time, and therefore, a power-up request is output when the current time (has passed) is larger than the frequency start value as generated from the period start time generation section 124.

In FIG. 1, the CPU 23 is set so as to control the transmission and receiving of data based on the operation clock signal.

Each clock signal in the previous clock supply section 6 is performed in an oscillation circuit (1)8 and an oscillation circuit (2)0 of the clock generation section 7, and, for example, may adopt a quarts oscillation element and a RC oscillation element. The frequency divider 10 may be adopted when necessary; however, the present invention is not intended to be limited to this.

Figure 7:
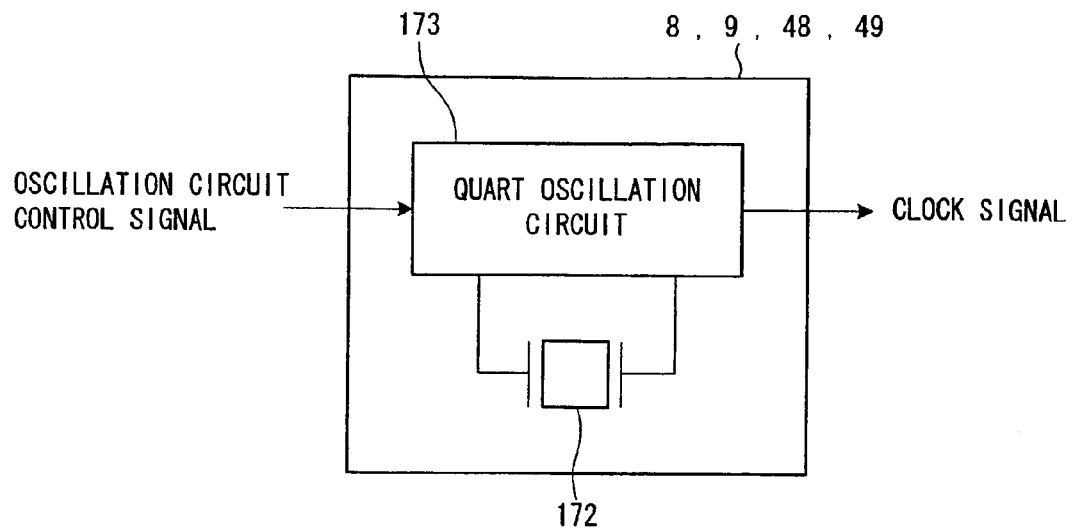
FIG. 7(a) and FIG. 7(b) are block diagrams of oscillation circuits of the radio communication equipment, wherein FIG. 7(a) explains the case of adopting a crystal oscillator, and FIG. 7(b) explains the case of adopting an RC oscillator.
Figure 7:
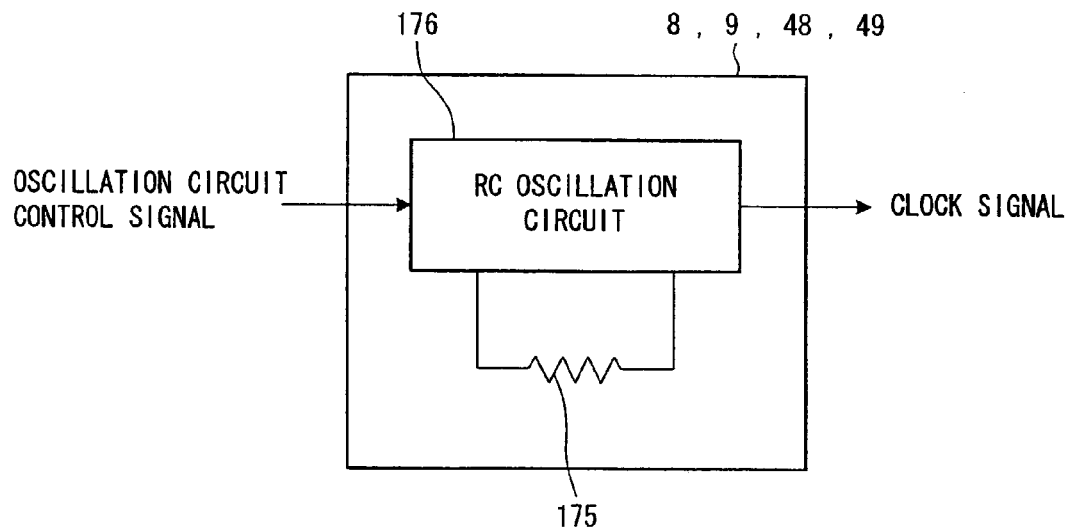

FIG. 7(*a*) adopts the structure wherein crystal oscillators are adopted for the oscillation circuit (1)8 and the oscillation circuit (2)9. In FIG. 7(*a*), each of the oscillation circuits 8 and 9 is constituted by a quart oscillator 172 and a quart oscillator 173, and outputs a clock signal when a control signal is input to the oscillation circuit. In FIG. 7(*b*), each of the oscillation circuits 8 and 9 is constituted by an RC oscillation element 178 and an RC oscillation circuit 176, and outputs a clock signal when inputting a control signal to the oscillation circuit.

In FIG. 1, when transmitting the transmission data as generated in the CPU 23 is subjected to the modulation process in the transmission process 13 of a modulation/ demodulation section 12, and is transmitted to the radio signal transmission/receiving section 2 as a transmission signal. In the radio signal transmission/receiving section 2, the transmission signal is subjected to the high frequency signal processing (frequency hopping, etc.) in the transmission circuit 3, and a radio signal is transmitted to an external device via the antenna switch 4 and the antenna 1.

On the other hand, when receiving, the radio signal as received via the antenna 1 and the antenna switch 4 is subjected to the high frequency signal processing in the receiving circuit 5 of the radio signal transmission/receiving section 2, and the resulting signal is output as a receiving signal. In the receiving processing section 14 of the modulation/demodulation section 12, the receiving signal is subjected to the demodulation process, and the resulting receiving data is sent to the CPU 23.

The operations in the power save mode are characterized by performing the foregoing transmitting and receiving operations only in the limited period of time at each predetermined frequency. In this operation, while the transmitting/ receiving operations are not performed, the RF signal clock signal and the operation clock signal are stopped, and by stopping the radio signal transmission/receiving section 2, the modulation/demodulation section 12 and the CPU 23 of large power consumption at the same time, an overall power consumption of an entire radio communication equipment can be stopped.

The power-down clock signal is always supplied in the period where the transmission/receiving operation is not performed; on the other hand, the supply of the power-down signal is stopped while transmitting/receiving operation is not performed.

Figure 8:
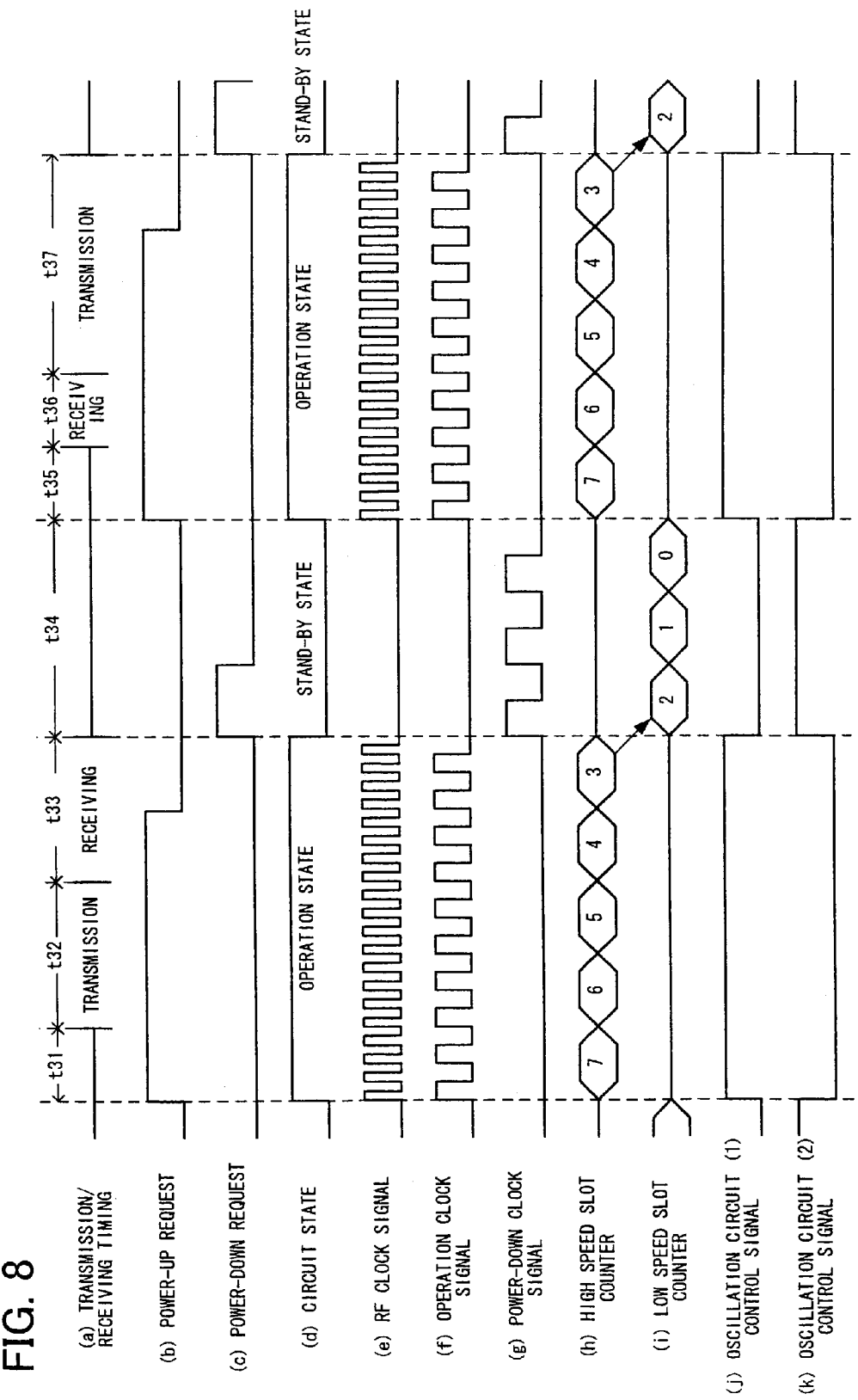
FIG. 8 shows timing charts, which schematically explain respective operations of the radio communication equipment.

FIG. 8 is a timing chart of a radio communication equipment of FIG. 1 in accordance with one embodiment of the present embodiment. The operations of reducing power consumption by performing transmitting/receiving operations only in the predetermined period for every predetermined frequency, will be explained based on the timing chart of FIGS. 8(*a*) and 8(*b*).

The transmission and receiving timings are as illustrated in FIG. 8(*a*), and transmission and receiving operations are performed alternately in the order according to the communication system adopted in the radio communication equipment. When transmitting the time period t32 or the time period t37, the CPU 23 generates the transmission data, and the modulation/demodulation section 12 modulates the transmission data and transmits the resulting modulated data to the radio signal transmission/receiving section 2 and the antenna 1.

In the receiving period, such as the period t33, the period t36, etc., the modulation/demodulation section 12 outputs the receiving period, such as the period t33, the period t36, etc., the modulation/demodulation section 12 outputs the receiving signal as received via the antenna 1 and the radio signal transmission/receiving section 2, and is output to the CPU 23 as receiving data. Depending on the amount of data to be transmitted/received, the length of the transmission/ receiving period is adjusted (extended/reduced).

Other than the transmission/receiving period, there exists a period where neither the transmission nor the receiving is performed like the period t34, and the length of the period is set based on the predetermined frequency, etc. The period t34 where the transmission/receiving is performed can be several minutes long, and in order to reduce the power consumption, the supply of the RF clock signal (e) to the radio signal transmission/receiving section 2 or the supply of the operation clock signal (f) to the modulation/demodulation section 12 or the CPU 23 is stopped.

The transmission and receiving period is set based on a count value of the high speed slot counter 20. On the other hand, the period where neither the transmission or receiving is performed is set based on the count value of the low speed slot counter 21.

When the circuit becomes active and the transmission/ receiving is started, the radio signal transmission/receiving section 2 performs transmission/receiving operations based on the RF clock signal (e) supplied from the clock supply section 6. On the other hand, the modulation/demodulation section 12 performs modulation/demodulation operations based on the operation clock signal (f) as supplied from the clock supply section 6.

In the meantime, the high speed slot counter 20 of the frequency counter section 19 starts counting the number of communication slots (predetermined frequency) until the circuit is operated next based on the operation signal (f).

After the counting of the number of slots for the transmission/receiving period in the high speed slot counter 20 is completed, in the request signal generation section 22, the power down request signal (c) is output from the request signal generation section 22 to the clock control section 11.

When supplying the power down request signal (c) "1" indicative of the on-state, the operation of the oscillation circuit (1)8 is stopped, and respective control signals (J) and (k) which start operating the oscillation circuit (2)9 are output respectively. Then, upon inputting the respective control signals (j) and (k) which stop the operation of this oscillation circuit (1)8 and start the operation of the oscillation circuit (2)9 to the oscillation circuit (1)8 and the oscillation circuit (2)9 respectively, the supply of the RF clock signal (e) and the operation clock signal (f) is stopped, and the circuit other than the low speed counter 21 is set in the stand-by state. The foregoing conditions are maintained until the power-up request signal (b) (to be described later) becomes "1" (indicative of on-state) even after the power down request signal (c) becomes "0" (indicative of off-state).

Then, the supply of the RF clock signal (e) and the operation clock signal (f) is stopped, and in the meantime, the power down clock signal (g) is generated from the oscillation circuit (2)9. In this state, in the frequency count section 19, the low speed slot counter 21 starts operating based on the power down clock signal (g), and following the count value of the high speed slot counter 20 as stopped, an operation of counting the number of pseudo communication slots continues.

When the low speed slot counter 21 finishes counting the number of slots for a predetermined frequency, the request signal generating section 22 outputs a power-up request signal (b) to be supplied to the clock control section 11.

Upon receiving the power-up request signal (b), the clock control section 11 outputs respective control signals (j) and (k) for starting the oscillation circuit (1)8, and stopping the oscillation circuit (2)9.

When respective control signals (j) and (k) for starting the oscillation circuit (1)8, and stopping the oscillation circuit (2)9 are input to the oscillation circuit (1)8 and the oscillation circuit (2)9, the clock generating section 7 generates the RF clock signal (e) and the operation clock signal (f), and stops the supply of the power down clock signal (g).

The foregoing state is maintained until the power down request signal (c) "1" (indicative of the ON state) is supplied, even when the power-up request signal (b) becomes "0" (indicative of OFF state).

Then, the entire circuits of the radio communication equipment become active, and the transmission and receiving operations are restarted. By repeating the foregoing operations, the radio communication equipment of the present invention performs transmission and receiving operations for a predetermined period at every predetermined period, and the operations of the circuits are stopped when transmission/receiving operations are not performed to realize a reduction in power consumption.

In the first embodiment of the present embodiment, the request signal generating section 22 outputs a power-up request signal ahead of time (for example, before one slot period) prior to the actual transmission/receiving start time as in the time period t31 and the time period t35.

Here, by arbitrary setting the count value when generating the request signal, the present invention can be flexibly adjusted to characteristics of the device such as oscillation circuits for use in the radio signal transmission/receiving section 2, the clock generating section 7, etc.

According to the foregoing arrangement, by arranging so as to generate these request signals ahead of time, respective oscillations of the RF clock signal and the operation clock signal can be made stable when actually starting the transmission/receiving operations, and the radio signal transmission/receiving section 2 and the modulation/demodulation section 12 can be operated under stable conditions.

Further, the foregoing structure provided with the time correcting section 18 storing the lastly reproduced current time (expected current time) of the circuit can always offer accurate count values in the period count section 19 even when a difference in current time occurs between the transmission side and the receiving side of the radio communication equipment due to the radio communication state, repetitive restoration from the stand-by state to the operable state, or when a correction is made for the adjustment of the current time.

In the period where the transmission and receiving operations are not performed, the supply of the operation clock signal is stopped, which in turn stops the operation of the CPU 23, thereby reducing the power consumption. To restart the operation of the CPU 23, the power-up request signal (b) can be use as an interruption signal.

According to the present embodiment, the low slot counter 21 for counting following the count value of the high speed slot counter 20 is provided, and in the period where the transmission and receiving operations are not being performed, only the low speed slot counter 21 for counting the number of slots based on the power-down clock signal (g) is operated, and the operations of not only the radio signal transmission/receiving section 2 and the modulation/demodulation section 12 but also the CPU 32 are stopped, thereby significantly reducing an amount of power consumption as compared to the conventional structure.

According to the radio communication equipment, a power-up request signal is output ahead of actual transmission/receiving start time, and the time correcting section 18 is provided. With this structure, it is possible to flexibly adjust to the respective characteristics of the devices which constitute the radio communication equipment, and when restarting the transmission/receiving operations, a circuit operation can be realized under stable conditions. Further, with the foregoing structure, it is possible to realize a radio communication equipment which performs transmission/receiving operations with accuracy under stable conditions without being adversely affected by a displacement in current time of the radio communication equipment due to the radio communication state or the repetitive feedback from the standby state to the operable state.

Second Embodiment

Figure 9:
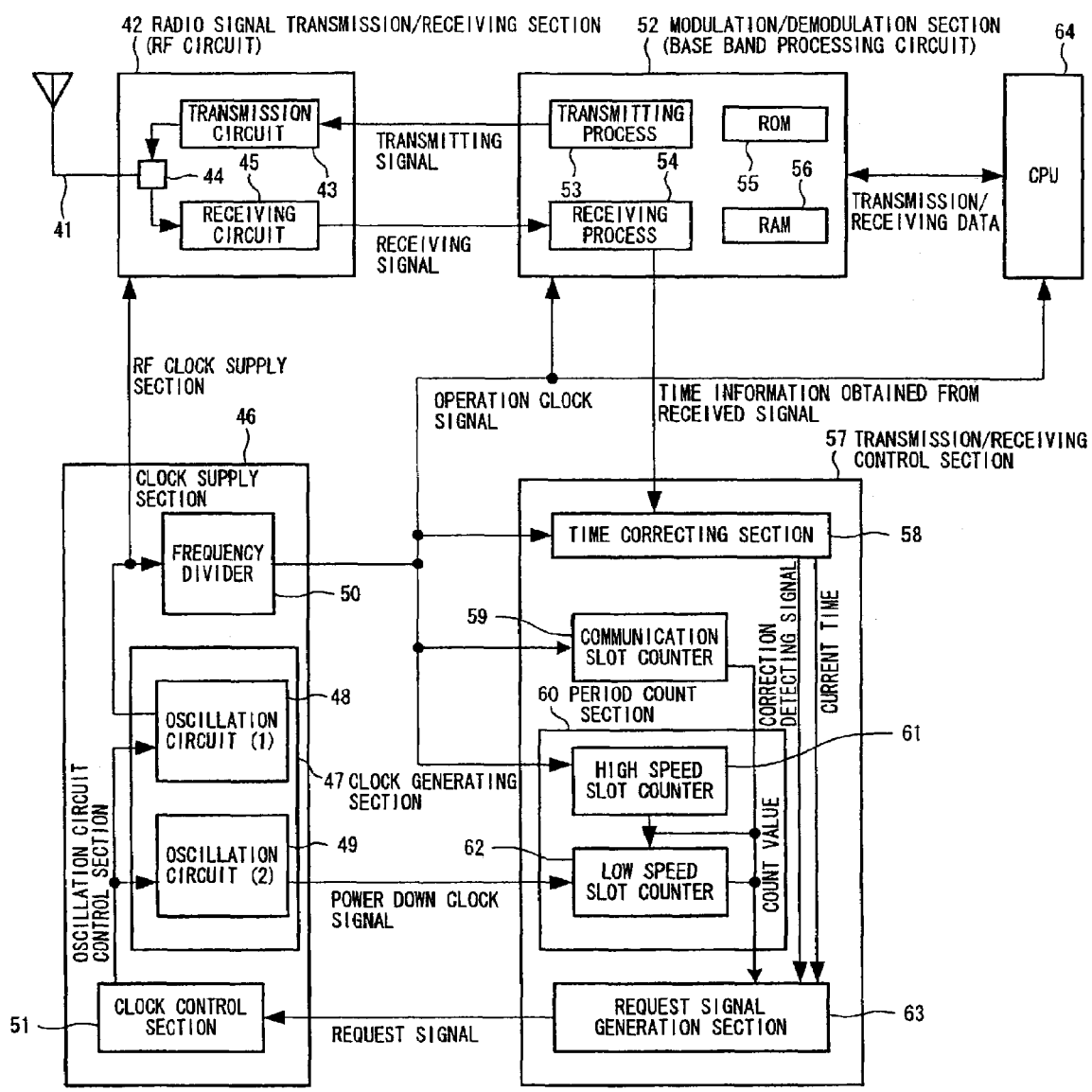
FIG. 9 is a block diagram which explains the schematic structure of a radio communication equipment in accordance with the second embodiment of the present invention.

The following descriptions will explain the radio communication equipment in accordance with the second embodiment. As illustrated in FIG. 9, the radio communication equipment in accordance with the present embodiment adopts a radio communication system of a Blue tooth system as one example of a short distance radio communication system of the frequency hopping type spectrum dispersion system, and includes an antenna 41, a radio signal transmission/receiving section (RF circuit) 42, a clock supply section 46, a modulation/demodulation section (base band processing circuit) 52, a transmission/receiving control section 57 and a CPU 64 for controlling the entire radio communication equipment.

The radio communication equipment in accordance with the present embodiment differs from the radio communication equipment in accordance with the first embodiment in that a communication slot counter 59 for starting the counting of the number of slots from the initial transmission/receiving is provided in the transmission/receiving control section 57, and with this structure in the state where the transmission and receiving of data is permitted, when the value of the communication slot counter 59 reaches a predetermined value (i.e., when the data transmission and receiving is not performed for a predetermined time), it is forced to be set in the stand-by state. Namely, by forcefully setting the communication device in the stand-by state, it is possible to reduce the power consumption, and a delicate control according to a given communication state can be performed.

The antenna 41 is provided for transmitting or receiving a radio signal with the external device. The clock supply section 46 includes an oscillation circuit (1)48, an oscillation circuit 2(49), a frequency divider 50 and a clock control section 51, and is arranged so as to supply respective clock signals, i.e., a RF clock signal, an operation clock signal, and a power down clock signal as in the first embodiment.

The clock control section 51 is set so as to control each clock signal based on a request signal from the request signal generation section 63. The RF clock signal is a signal generated from an oscillation circuit (1)48. The operation clock signal is provided for dividing the RF clock signal generated from the oscillation circuit (1)48. The power down clock signal is a clock signal having a slot width frequency as generated from the oscillation circuit (2)49.

The radio signal transmission/receiving section 42 is constituted by the transmitting section 43, the receiving circuit 45 and the antenna switch 44. This radio signal transmission/receiving section 42 performs a radio signal processing by the transmission circuit 43 and the receiving circuit 45 while switching the transmission/receiving by the antenna switch 44 based on the RF clock signal.

The modulation/demodulation section 52 is constituted by a transmission processing section 53, a receiving processing section 54, a ROM 55, a RAM 56, etc., and performs modulation/demodulation process with respect to a receiving signal from the radio signal transmission/receiving section 42 and a transmitting signal to the radio signal transmission receiving section 42 based on an operation clock signal.

The transmission/receiving control section 57 includes a time correcting section 58, a communication slot counter 59, a frequency counting section 60 and a request signal generation section 63. The time correcting section 58 stores the lastly reproduced current time of the circuit as obtained from the received signal by the receiving processing section 54. The time correcting section 58 has the same structure as the first embodiment as illustrated in FIG. 3.

The frequency count section 60 shown in FIG. 9 counts the number of slots based on a signal obtained by dividing the frequency of the operation clock signal by the high speed sot counter 61 while an operation clock signal is being supplied; while in the state where the supply of the operation clock signal is stopped, the low speed counter 62 counts the number of slots based on the power-down clock signal following the count value of the high speed slot counter 61.

The respective structures of the high speed slot counter 61 and the low speed slot counter 62 are the same as the first embodiment as illustrated in FIGS. 4 and 5. The communication slot counter 59 shown in FIG. 9 counts the number of slots from the communication slot as initially transmitted or received based on a signal obtained by dividing the frequency of the operation clock signal.

The high speed slot counter 61 and the communication slot counter 59 store therein frequency dividing circuits respectively for dividing the frequency of each operation clock. The frequency of the clock as divided is basically set to the frequency of a power down clock (slot period).

Figure 10:
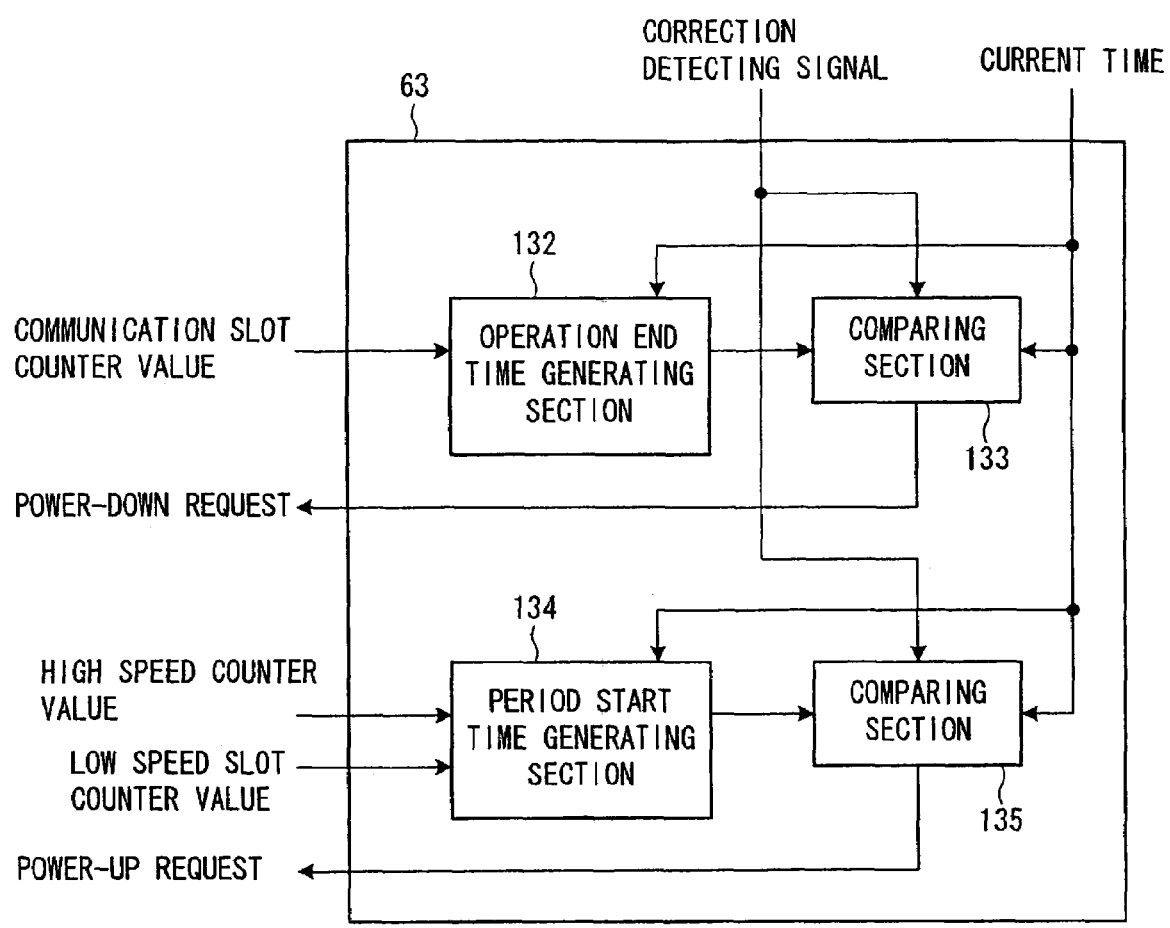
FIG. 10 is a block diagram which explains the schematic structure of a request signal generating section in the radio communication equipment in accordance with the second embodiment of the present invention.

Based on the count value of the frequency count section 60, the request signal generating section 63 supplies a request signal with respect to the clock control section 51 based on the count value of the frequency count section 60. As illustrated in FIG. 10, the structure of a request signal generation section 63 is constituted by respective comparing sections 133, 135, an operation end time generating section 132 and a period start time generating section 134.

The operation end time generating section 132 stores therein an adder, and a communication slot counter value and current time are added by the adder so as to generate an operation end time.

The comparing section 133 compares the operation end time as generated by the operation end time generating section 132 with the current time, and outputs a power down request when the operation comparison time coincides with the current time. However, when a correction detecting signal is input, the operation end time may not coincide with the current time, and in the case where the operation comparison time does not coincide with the current time, a power-down request is output when the current time passes over the operation end time as generated from the operation end time generation section 132.

On the other hand, the period start time generating section 134 stores therein an adder, and a high speed slot counter value in an operation state, a low speed slot counter value in a stand-by state, and a current time are added by an adder stored therein, and a period start time is then calculated.

The comparator 135 compares a period start time generated by the period start time generating section 134 with current time, and outputs a power-up request when the period start time coincides with the current time. However, when a correction detecting signal is input, the period start time may not coincide with the current time, and in the case where the period start time does not coincide with the current time, a power-up request is output when the current time passes by far over the period start time as generated from the period start time generating section 134.

The clock control section 51, and the oscillation circuits (1)48 and (2)49 shown in FIG. 9 have the same structure as those of the first embodiment as illustrated in FIG. 2, FIGS. 7(*a*) and 7(*b*).

The CPU 64 shown in FIG. 9 transmits/receives data based on an operation clock signal. For the generation of each clock signal in the clock supply section 46, a crystal oscillation element having an oscillation frequency of from 12 mega hertz (MHz), 13 mega hertz or 16 mega hertz may be adopted. For the operation clock signal, a clock signal having a frequency of 1 mega hertz obtained by, for example, dividing the RF signal by a frequency divider 50 may be adopted. For the generation of a power down clock signal, a quarts oscillation element having an oscillation frequency of 32 kilohertz may be adopted.

When transmitting, the transmission data as generated from the CPU 64 is subjected to the modulation process in the transmission processing section 53 of the modulation/demodulation section 52, and the resulting data is sent to a radio signal transmission/receiving section 42 as a transmission signal. Further, in the radio signal transmission/receiving section 42, the transmission signal is subjected to the high frequency signal processing by the transmission circuit 43, and is transmitted via the antenna switch 44 and the antenna 41.

On the other hand, when receiving, the radio signal received via the antenna 41 and the antenna switch 44 is output as a receiving signal following the high frequency signal process by the receiving circuit 45 of the radio signal transmission/receiving section 42. The receiving signal is subjected to the modulation process in the receiving circuit 54 of the modulation/demodulation section 52, and the resulting modulated signal is sent to the CPU 64.

The characteristic feature lies in that a reduction in power consumption is realized by carrying out transmission and receiving operations only for a predetermined period at every predetermined cycle. In this operation, the power consumption of the entire radio communication equipment can be reduced by stopping the supply of the RF clock signal and the operation clock signal in the period where the transmission/receiving operation is not performed, and in the meantime stopping the supply of the radio signal transmission/receiving section 42, the modulation/demodulation section 52 and the CPU 64 of large power consumption.

The power-down clock signal is always supplied in the period where transmission/receiving is not performed; on the other hand, the supply of the power down clock signal is stopped in the period where the transmission/receiving operation is performed.

As one example of a power save mode in the Bluetooth radio communication standard, a sniff mode specification for performing transmission/receiving operations at every predetermined cycle for a predetermined period is disclosed.

In this example, the characteristic features lie in that in the sniff mode, transmission and receiving operations are to be performed only for a predetermined period at every predetermined cycle, and it is set in the stand-by period while transmission and receiving is not being performed, and a receiving operation is continued as long as data packet addressed to it is being received, and after a receiving operation is completed, a transmission/receiving period is extended either by the extension period set after the receiving of data has been completed, or the transmission/receiving period is extended either by the extension period set separately or the remaining predetermined transmission/receiving period whichever is longer.

Figure 11:
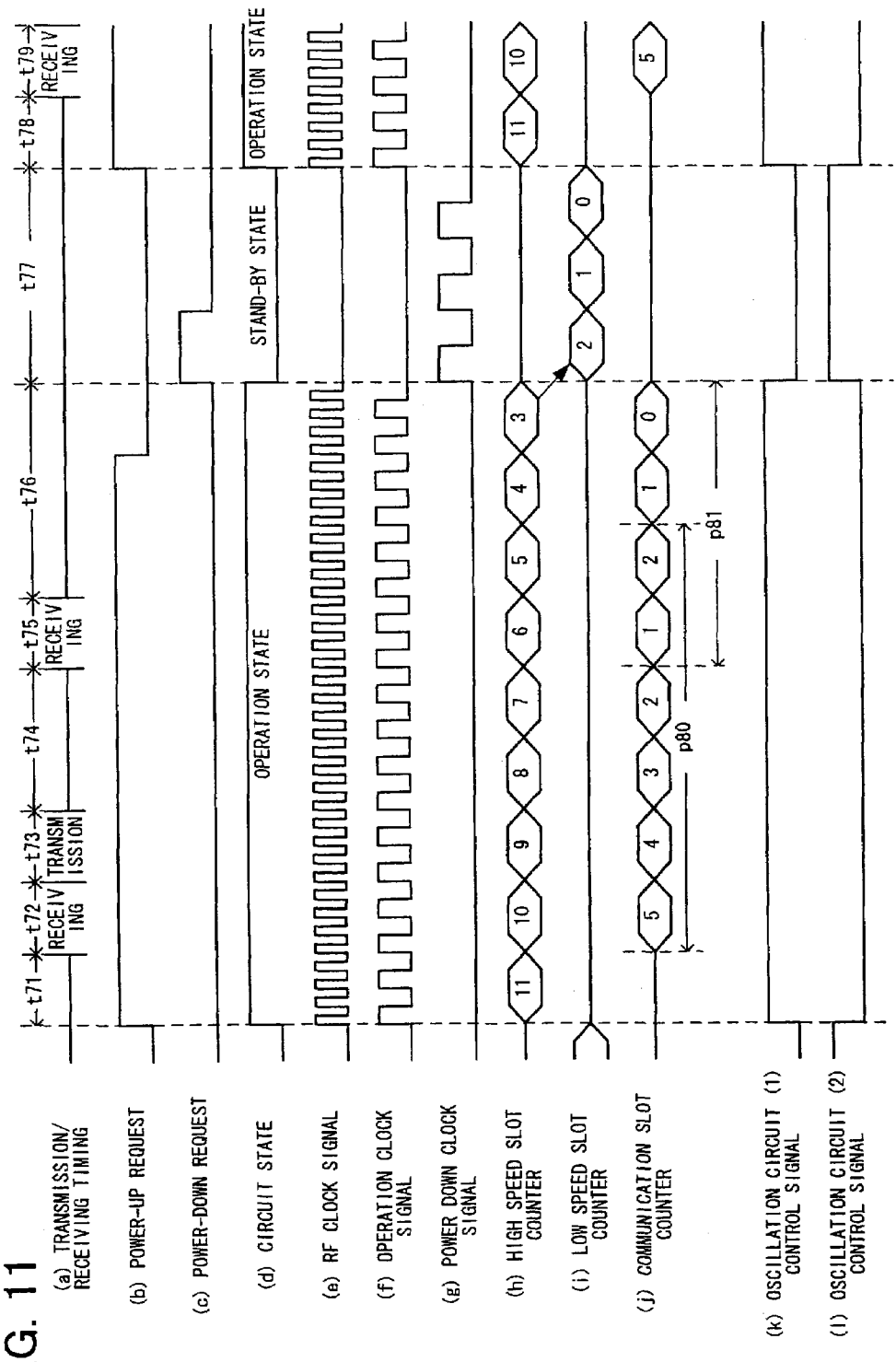
FIG. 11 is a timing chart which schematically explains one example of operations of the radio communication equipment, as one example.
Figure 12:
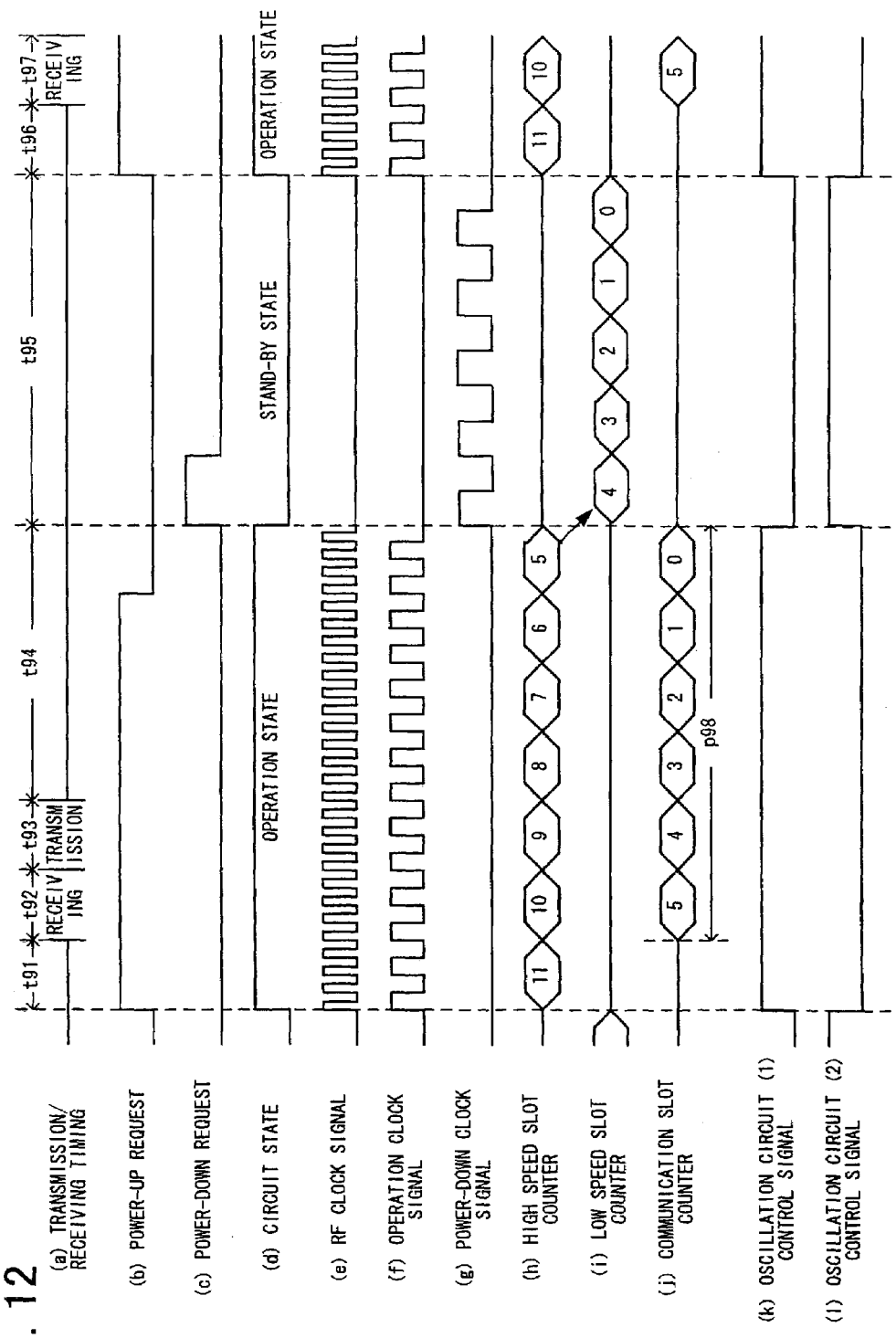
FIG. 12 is a timing chart which schematically explains another example of operations of the radio communication equipment, as another example.

In the foregoing second embodiment of the present invention, the Bluetooth system is adopted for the radio communication system, and an operation in sniff mode is set as an example of performing the transmitting/receiving operations only in a limited period of time. FIGS. 11, 12 and 9 are timing charts related to radio communication equipments in accordance with the second embodiment of the present invention.

An operation in sniff mode will be explained in reference to timing charts of FIGS. 11 and 12. As shown in the transmission receiving timing of FIG. 11(*a*), transmission and receiving are performed alternately in the order according to the Bluetooth communication system adopting the radio communication equipment. FIG. 11 shows an operation as a slave device in which the management of the entire network is relied on an external device.

When transmitting the period t73, the CPU 64 generates transmission data, and the modulation and demodulation section 52 modulates transmission data and transmits the modulated data to the radio signal transmission/receiving section 42 and the antenna 41. When receiving the period t72, the period t75, t79, etc., the modulation/demodulation section 52 outputs a receiving signal as received via the antenna 41 and the radio signal transmission/receiving section 42 the CPU 64.

The length of the period which performs the transmission/receiving can be set longer or shorter depending on the amount of data transmitted/received. On the other hand, in the period t77 where the transmission and receiving is not performed like the period t77, the length of the period is determined by set predetermined frequency and the transmission/receiving amount of data, etc.

The period t77 in which the transmission/receiving is not period extends over several minutes. In this period, in order to reduce the power consumption, a supply of an RF clock signal (e) to the radio signal transmission/receiving section 42, and a supply of an operation clock signal (f) to the modulation/demodulation section 52 and the CPU 64 are stopped.

Incidentally, the transmission/receiving period is set to a count value of a communication slot counter 59. In the period where the transmission and receiving are not performed depends on a count value of the low speed slot counter 62.

For explanations, the period, in which a transmission/receiving operation is performed set in a sniff mode of the "Bluetooth" communication standard is referred to as "sniff mode", a predetermined period in which the sniff slot is regularly repeated is set to a "sniff mode", a minimum period an attempt period (corresponding to minimum sniff slot).

The respective parameters in FIG. 11 are set as follows. The "sniff period" is around 12 slots, the attempt period is, for example, 6 slots which is shorter than the sniff period, which is, for example, 6 slots, and the "time-out period" is shorter than the "attempt period", which is, for example, 4 slots.

When the circuit becomes operable, and a transmission/receiving operation is started, based on the RF clock signal (e) supplied from the clock supply section 46, the radio signal transmission/receiving section 42 performs transmission/receiving operations. The modulation/demodulation section 52 performs a modulation/demodulation operation based on an operation clock signal (f) supplied from the clock supply section 46.

In the meantime, the high speed slot counter 61 of the frequency count section 60 starts counting the number of communication slots till the next circuit becomes operable (a predetermined period="sniff period" minutes represented from the period t71 to t77) based on an operation clock signal (f).

In the meantime, the communication slot counter 59 starts counting the number of communication slots (attempt period represented by the period p80) which performs the minimum transmission/receiving based on the operation clock signal (f).

When carrying out the transmission/receiving of data addressed to the radio communication equipment itself during the attempt period represented by the period p80, if the remaining attempt time is shorter than the time-out period, the count value of the communication slot counter 59 is smaller than the time-out period, the count value of the communication slot counter 59 is written on the value for the time-out period, the sniff slot is extended for the time-out period represented by the period p81 from the data transmission/receiving.

Needless to mention, in the case where transmission/receiving is performed, an extended operation of the sniff slot is repeated, and a count operation is continued until the transmission/receiving has been completed, and the time-out period has passed. In this state, when the sniff slot is extended over the sniff period, and is connected to the next sniff slot, the count value of the communication slot counter 59 is written on the number of slots for the attempt period again upon inputting the new sniff slot.

Figure 13:
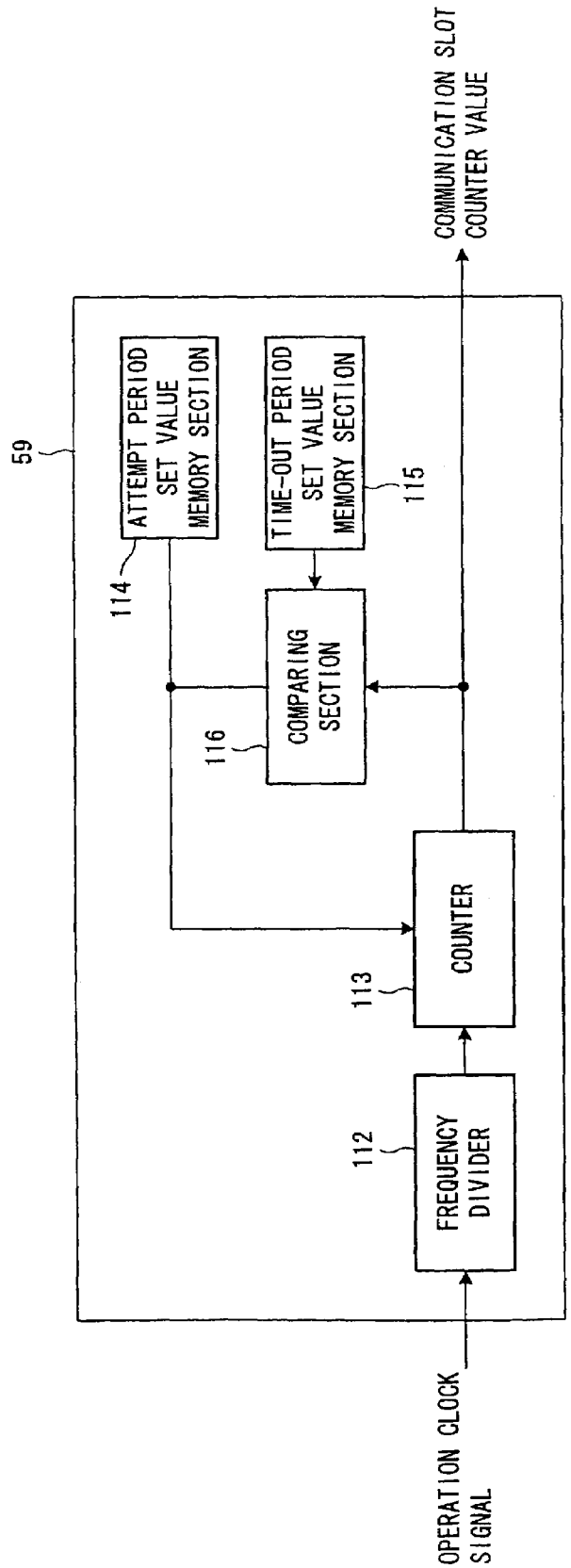
FIG. 13 is a block diagram which schematically explains a communication slot counter in the radio communication equipment.

The foregoing operation is performed for presenting an occurrence of such problem. That is, upon entering into a new sniff slot, and completing the counting by the communication slot counter 59 immediately, As illustrated in FIG. 13, the communication slot counter 59 includes a frequency divider 112 for dividing an operation clock signal into a slot width, a counter 113, a comparator 116, an attempt period set memory section 114, and a time-out period set value memory section 115, and is arranged so as to start a count operation of the counter value 113 based on an initial value of the attempt period set value stored in the attempt period set memory section 114.

In the case of performing transmission and receiving of data to the radio communication equipment itself, the count value of the counter 113 is compared with the time-out period set value stored in the time out period set value memory section 115 by the comparator 116, and in the case where the count value is smaller than the time-out period set value stored in the time-out period set value memory section 115, the set value of the time-out period set value memory section 115 is overwritten in the time-out period set value memory section 115.

On the other hand, in the case where the data transmission and receiving to the radio communication equipment itself.

When the circuit is set in an operational state, and transmission and receiving operation is started, based on an RF clock signal (e) supplied from the clock supply section 46, the radio signal transmission/receiving section 42 performs transmission and receiving operations. The modulation and demodulation section 52 performs a modulation/demodulation operation based on an operational clock (f) supplied from the clock supply section 46. Incidentally, the modulation/demodulation section 52 performs a modulation/demodulation operation based on the operational clock signal (f) supplied from the clock supply section 46.

In the meantime, in the communication slot counter 59, the number of communication slots (attempt period represented by the period p98) for minimum transmission and receiving based on a signal obtained by dividing an operation clock signal (f).

In the meantime, the communication slot counter 59 starts counting the number of communication slots for the starts counting the number of communication slots for minimum transmission/receiving based on a signal obtained by dividing the frequency of the operational clock signal (f).

As shown in FIG. 12, data transmission/receiving to the radio communication equipment is not performed in the attempt period p98, the count value of the communication slot counter 59 is not overwritten, and a counting operation continues until the end of attempt period.

Upon completing the counting of the number of slots for the period in which transmission/receiving is performed in the communication slot counter 59, from the request signal generation circuit 63, a power down request signal (c) is output to be supplied to the clock control section 51.

Upon completing the counting of the number of slots for the transmission/receiving period in the communication slot counter 59, a power down request signal (c) is output from the request signal generation section 63 to be supplied to the clock control section 51. When supplying the power down request signal (c), the clock control section 51 stops the oscillation circuit (1)48, and outputs each control signal (k)(l) for starting the oscillation circuit (2)49. Then, respective control sections (k) and (l) for stopping the oscillation circuit (1)48 and starting the oscillation circuit (2)49 are input to the oscillation circuit (1)48 and the oscillation circuit (2)49, the supply of the RF clock signal (e) and the operation clock signal (f) generated from the oscillation circuit (1)48 of the clock generation section 47 is stopped, and circuits other than the low speed slot counter 62 is set in the stand-by state.

In the meantime, the power-down clock signal (g) is generated. In this state, in the period count section 60, the low speed slot counter 62 starts an operation based on the power-down clock signal (g) following the count value of the stopped high speed slot counter 61, and continues an operation of counting the number of communication slots until the next circuit becomes operable.

Upon completing the counting of the number of slots for a predetermined sniff period, the power-up request signal (b) is output from the request signal generating section 63 to be supplied to the clock control section 51.

When supplying the power-up request signal (b), the clock control section 51 starts the oscillation circuit (1) 48, and outputs signals (k) and (l) stopping the oscillation circuit (2)49.

Upon inputting the signals (k) and (l) for starting the oscillation circuit (1)48 and stopping the oscillation circuit (2)49 respectively, the RF clock signal (e) and the operation clock signal (f) are generated from the clock generating section 47, and the supply of the power down clock signal (g) is stopped. Then, the circuit becomes operable, and the transmission and receiving are started again.

According to the radio communication equipment of the present invention, by repeating the foregoing process, transmission and receiving is performed by preparing a sniff slot by a predetermined attempt period at every predetermined sniff period, the power consumption for storing the circuit operation of the period where transmission and receiving is not performed is reduced, and the sniff slot is extended for the time-out period when transmitting/receiving data in the attempt period.

According to the second embodiment of the present embodiment, during the period t71 and the period t78 of FIG. 11, and the period t91 and the period t96 shown in FIG. 2, a request signal generation section 63 is constituted by outputting the power-up request signal (b) (for example, for one slot period) earlier than the actual transmission/receiving start time.

Here, by randomly setting a count value when generating the request signal, it is possible to flexibly deal adjust to the characteristics of such device as oscillator, etc., for use in the radio signal transmission/receiving section 42, the modulation/demodulation section 52 under stable conditions.

As described, by setting so as to generate the request signal ahead of time, when actually starting the transmission and receiving, respective oscillations of the RF clock signal and the operation clock signal can be made stable, and it is therefore possible to operate the radio signal transmission/receiving section 42 and the modulation/demodulation section 52 under stable conditions.

Further, the present invention is provided with the time correcting section 58 for storing the lastly reproduced current time (expected current time) of the circuit. With this characteristic structure, it is possible to adjust a count value in the transmission/receiving control section 57 to a count value even when a difference in current time occurs between the transmitting side and the receiving side of the radio communication equipment due to the radio communication state or the repetitive feedback from the stand-by state to the operable state, or when a correction is made for the adjustment of the current time.

While transmission and receiving operations are not being performed, the supply of the operation clock signal is stopped, and the power consumption can be reduced. Further, in order to restart the operation of the CPU 64, it is possible to use a power-up request signal (b) as an interruption signal.

The present embodiment adopts the low-speed slot counter 62 for counting following a count value of the high-speed slot counter 61, and in the period where transmission/receiving is not being performed, as an operation of only the low-speed slot counter 62 for counting the number of slots in the power down clock signal (g), the operations of not only the radio signal transmission/receiving section 42 and the modulation/demodulation section 52 but also the CPU 64 are stopped. As a result, it is possible to significantly reduce the power consumption.

Further, by rewriting the count value of the communication slot counter 59 into an appropriate count value accordingly based on the amount of transmission/receiving data and the timing, it is possible to control the sniff slot according to a given situation so that power consumption can be reduced without disturbing a transmission/receiving operation.

According to the radio communication equipment, a power-up request signal is output ahead of actual transmission/receiving start time, and the time correcting section 58 is provided. With this structure, it is possible to flexibly adjust to the respective characteristics of the devices which constitute the radio communication equipment, and when restarting the transmission/receiving operations, a circuit operation can be realized under stable conditions. Further, with the foregoing structure, it is possible to realize a radio communication equipment which performs transmission/receiving operations with accuracy under stable conditions without being adversely affected by a displacement in current time of the radio communication equipment due to the radio communication state or the repetitive feedback from the standby state to the operable state.

As described, the radio communication equipment of the present invention is provided with a radio signal transmission/receiving section (RF circuit part) for communicating with an external device by transmitting and receiving data via radio waves; a modulation/demodulation section (baseband processing circuit part), connected to the radio signal transmission/receiving section (RF circuit part), for modulating a transmitting signal and demodulating a receiving signal; a clock generating section for generating an RF clock signal, an operation clock signal, and a power-down clock signal respectively in accordance with a control signal, (i) the RF clock signal having a high frequency and serving as reference for driving the radio signal transmission/receiving section, (ii) the operation clock signal being for normal operation and serving as reference for driving each section except the radio signal transmission/receiving section, and (iii) the power-down clock signal having a low frequency being for reducing power consumption; a period count section, including a high speed slot counter and a low speed slot counter, for counting slots corresponding to duration of a period for transmission and receiving, the high speed slot counter driven in accordance with the operation clock signal thus generated by the clock generating section, and the low speed slot counter driven in accordance with the power down clock signal having the low frequency and being thus generated by the clock generating section; a request signal generating section for receiving a count value of the slots counted by the high speed slot counter and a count value of the slots counted by the low speed slot counter, and for outputting a request signal (a) when the count value counted by the high speed slot counter reaches a predetermined value and (b) when the count value counted by the low speed slot counter reaches the predetermined value; and a clock control section for outputting the control signal in accordance with the request signal.

In the above arrangement, the RF clock signal having the high frequency and being generated by the clock generating section is supplied to the radio signal transmission/receiving section (RF circuit part) and the operation clock signal for normal operation is supplied to each section except the radio signal transmission/receiving section (RF circuit part). The present invention may be so arranged that the operation clock for normal operation is generated by subjecting a clock for RF to frequency division.

In the arrangement, each clock signal is controlled by the clock controlling section. With this arrangement, in case where the transmission and receiving are carried out only in a certain transmission and receiving period every predetermined number of cycles, it is possible to stop supplying the RF clock signal and the operation clock signal during the period in which no transmission and receiving are carried out.

The radio signal transmission/receiving section (RF circuit part) transmits and receives a signal to/from an external device via radio waves, based on the RF clock signal.

In case where the transmission and receiving are carried out only in a certain transmission and receiving period every predetermined number of cycles, the radio signal transmission/receiving section (RF circuit part) can stop operating in the period in which no transmission and receiving are carried out.

The modulation/demodulation section (baseband processing circuit part) modulates a transmitting signal and demodulates a receiving signal (that is modulates a signal to be transmitted and demodulates a signal thus received).

In case where the transmission and receiving are carried out only in a certain transmission and receiving period every predetermined number of cycles, blocking of the operation clock signal can stop operation of the modulation/demodulation section (baseband processing circuit part) in the period, in which no transmission and receiving are carried out.

The period count section, which is provided with a high speed slot counter and a low speed slot counter, counts slots corresponding to duration of a period for transmission and receiving, the high speed slot counter driven in accordance with the operation clock signal thus generated by the clock generating section, and the low speed slot counter driven in accordance with the power down clock signal having the low frequency and being thus generated by the clock generating section.

In case where the transmission and receiving are carried out only in a certain transmission and receiving period every predetermined number of cycles, the high speed slot counter counts the slots in the period in which the transmission and receiving are carried out, and stops operating in the period in which no transmission and receiving are carried out.

Moreover, it is preferable that the low speed slot counter continues the count values counted by the high speed slot counter when the high speed slot counter stops operating, and continues the counting. In this case, the present invention may be so arranged that each section except the low speed slot counter stops operating in the period in which no transmission and receiving are carried out, so as to be in a stand-by state.

In shifting from (i) the period in which the transmission and receiving are carried out, to (ii) the period in which no transmission and receiving are carried out, and in shifting from (iii) the period in which no transmission and receiving are carried out, to (iv) the period in which the transmission and receiving are carried out, the radio communication equipment generates the request signal representative of each timing of the shifting.

Moreover, the present invention may be so arranged that the period count section is provided with a communication slot counter for counting slots in a period in which the transmission and receiving are carried out. In this case, by setting, in the period count section, (i) a number of slots representing duration of a cycle, (ii) a number of slots representing the period (transmission and receiving period) in which the transmission and receiving are carried out, and (iii) a number of slots representing duration by which the transmission and receiving period is extended in case data communication is carried out in the transmission and receiving period, it is possible to carry on the data communication by extending the transmission and receiving period, in case the data communication is continued since the transmission and receiving period. Thus, it is possible to realize an arrangement which attains delicate control for reducing power consumption depending on an amount of communication, without deteriorating data communication.

On the other hand, it is also possible to arranged such that the predetermined cycle including the transmission and receiving period and the non-transmission and receiving period is kept constant even if the transmission and receiving period is continued until a next timing at which the transmission and receiving are resumed.

Moreover, it is preferable that the radio communication equipment includes a circuit for storing an expected current time expected from the lastly reproduced current time. By including such circuit in the radio communication equipment, it is possible to compare the expected time with current time detected from the receiving signal. Hereby, it is possible to detect shifting of a timing a clock at the receiving side from a timing of the clock at the transmission side due to condition in which radio communication is carried out, or correcting of the clock in terms of such shifting in timing. Therefore, by correcting the count value of the period count section to a correct value each time correction is needed, it is possible to accurately count without shifting the next timing at which the transmission and receiving are resumed.

Moreover, the radio communication equipment is capable of automatically operating in accordance with setting which enables such subtle control as to reduce the power consumption, even in case the transmission and receiving are carried out only in a certain transmission and receiving period every predetermined number of cycles. Thus, it is only necessary that data for setting should be received from the CPU part for controlling the whole circuit of the radio communication equipment.

Therefore, in case of an arrangement including the CPU part for controlling the whole circuit, it is possible to stop even operation of the CPU part in the non-transmission and receiving period, by using as an input to the clock control section, the request signal representative of a timing of transferring from the transmission and receiving period to the non-transmission and receiving period or a timing of transferring from the non-transmission and receiving period to the transmission and receiving period, the request signal generated by the present device.

As described, the method of the present invention for controlling a radio communication equipment, includes: process of transmitting and receiving a radio signal by communicating with an external device via radio waves representing data; process of modulating the radio signal before the transmitting and demodulating the radio signal after the receiving; process of performing clock control for stopping supplying an RF clock signal, an operation clock signal, and a power-down clock signal during a period in which no transmission and receiving are carried out; and the process of counting slots in communication, including (a) the process of counting slots at a high speed in accordance with the operation clock signal and (b) the process of counting at a low speed in accordance with the power-down clock signal.

In the process of transmitting and receiving a radio signal, the signal is transmitted and received to/from the external device in accordance with the RF clock signal. With the process of transmitting and receiving a radio signal, it is possible to stop the operation in the period in which no transmission and receiving are carried out, in case where the transmission and receiving are carried out only in a certain transmission and receiving period every predetermined number of cycles.

In the process of performing the clock control, each clock signal is controlled. Hereby, it is possible to stop the supply of the RF clock signal and the operation clock signal in the period in which no transmission and receiving are carried out, in case where the transmission and receiving are carried out only in a certain transmission and receiving period every predetermined number of cycles. The present invention may be so arranged that the power-down clock signal is surely supplied in the period in which no transmission and receiving are carried out, meanwhile the power-down clock signal is not supplied, in the period in which the transmission and receiving are carried out.

In the process (baseband processing process) of modulating the radio signal before the transmitting and demodulating the radio signal after the receiving, the radio signal to be transmitted (a transmitting signal) is modulated and the radio signal received (receiving signal), the radio signal is demodulated. With the process (baseband processing process) of modulating and demodulating, it is possible to stop the operation in the period in which no transmission and receiving are carried out, in case where the transmission and receiving are carried out only in a certain transmission and receiving period every predetermined number of cycles.

The process of performing period counting, in order to count slots in communication includes the (a) process of counting slots at a high speed in accordance with the operation clock signal, and the (b) process of counting at a low speed in accordance with the power-down clock signal.

In the process of counting the slots at the high speed, in case the transmission and receiving are carried out only in a certain transmission and receiving period every predetermined number of cycles, it is possible to count the slots in communication in the period in which the transmission and receiving are carried out, meanwhile, it is possible to stop the operation in the period in which no transmission and receiving are carried out.

Moreover, in the process of counting the slots at the low speed, it is possible to continues the count values counted in the process of counting the slots at the high speed when the process of counting the slots at the high speed stops, so as to continue the counting of the slots performed in the process of counting the slots at the high speed.

In this case, the present invention may be arranged such that each process except the process of counting the slots at the low speed is stopped in the period in which no transmission and receiving are carried out, thereby keeping, in the stand-by state, each process except the process of counting the slots at the low speed.

The method for controlling the radio communication equipment of the present invention may be so arranged as to include process of generating, in accordance with the count value counted in the process of counting the slots, a request signal representative of each timing of shifting from (i) the period in which the transmission and (a) receiving are carried out, to (ii) the period in which no transmission and receiving are carried out, and (b) shifting from (iii) the period in which no transmission and receiving are carried out, to (iv) the period in which the transmission and receiving are carried out.

Moreover, the present invention may be so arranged that the process of performing period count includes process of counting slots in communication in the period the transmission and receiving are carried out.

In this case, it is possible to set, in the process of performing period count, (i) a number of slots representing duration of a cycle, (ii) a number of slots representing the period in which the transmission and receiving are carried out, and (iii) a number of slots representing duration by which the transmission and receiving period is extended in case data communication is carried out in the transmission and receiving period.

By having each setting, even in case the transmission and receiving are carried out only in a certain transmission and receiving period every predetermined number of cycles, it is possible to carry on the data communication by extending the transmission and receiving period, in case the data communication is continued since the transmission and receiving period. Thus, it is possible to realize an arrangement which attains subtle control for reducing power consumption depending on an amount of communication, without deteriorating data communication.

On the other hand, it is also possible to arranged such that the predetermined cycle including the transmission and receiving period and the non-transmission and receiving period is kept constant even if the transmission and receiving period is continued until a next timing at which the transmission and receiving are resumed.

Moreover, by including such process of internally holding expected current time expected from the lastly reproduced current time, it is possible to compare the expected current time with current time obtained from the received signal. Hereby, it is possible to detect shifting of a timing a clock at the receiving side from a timing of the clock at the transmission side due to condition in which radio communication is carried out, or correcting of the clock in terms of such shifting in timing. Therefore, by correcting, to a correct value, the count value in the process of performing period count each time correction is needed, it is possible to accurately count without shifting the next timing at which the transmission and receiving are resumed.

Moreover, in the method for controlling the radio communication equipment, it is possible to automatically operate in accordance with setting which enables such subtle control as to reduce the power consumption, even in case the transmission and receiving are carried out only in a certain transmission and receiving period every predetermined number of cycles. Thus, it is only necessary that data for setting should be received from the CPU part for controlling the entire circuit of the radio communication equipment.

Therefore, in case of an arrangement including the process in the CPU part for controlling the whole circuit, it is possible to stop even the process in the CPU part in the non-transmission and receiving period, by using as an input to the process of controlling the clock, an output of the process of generating the request signal representative of a timing of transferring from the transmission and receiving period to the non-transmission and receiving period or a timing of transferring from the non-transmission and receiving period to the transmission and receiving period, the process of generating the request signal included in the present process.

Another radio communication equipment of the present invention is provided with a clock generating section for generating, respectively in accordance with a control signal, a first clock signal for the communication-permitting period, and a second clock signal for non-communication period; a first counter for counting the first clock signal, for the control of the communication-permitting period; a second counter for counting the second clock signal, for control of the non-communication period; and a clock control section for outputting the control signal in accordance with a count value of the first counter and a count value of the second counter, and causing the first counter and the second counter to count the count values continuously.

With the above arrangement, the counting is so carried out that the count value is continues between the first counter and the second counter, even if the communication permitting period, which is controlled by the first counter, is changed according to needs, that is, extended or shortened. Thus, it is possible to smoothly perform transfer between the communication permitting period (in which the communication is possible) and the non-communication period (in which the communication is not carried out), thereby ensuring the setting in both the periods. With this arrangement, it is possible to surely reduce the power consumption during the non-communication period.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A radio communication device, comprising:
   a radio signal transmitting/receiving section for transmitting and receiving data via radio waves; the radio signal transmitting/receiving section communicating with an external device by transmitting and receiving data therefrom;
   a modulation/demodulation section, connected to the radio signal transmitting/receiving section, for modulating a transmitting signal and demodulating a receiving signal;
   a clock generating section for generating an RF clock signal, an operation clock signal, and a power-down clock signal, respectively, in accordance with a control signal, (i) the RF clock signal having a high frequency and serving as a reference for driving the radio signal transmitting/receiving section, (ii) the operation clock signal being for normal operation and serving as a reference for driving each section except the radio signal transmitting/receiving section, and (iii) the power-down clock signal having a low frequency for reducing power consumption;
   a period count section, including a high speed slot counter and a low speed slot counter, the high speed counter for counting slots corresponding to a duration of a period for transmitting and receiving, the high speed slot counter driven in accordance with the operation clock signal generated by the clock generating section, and the low speed counter for counting slots corresponding to a duration of a period for no transmitting and receiving, the low speed slot counter driven in accordance with the power down clock signal having the low frequency generated by the clock generating section;

a request signal generating section for receiving a first count value of the slots counted by the high speed slot counter and a second count value of the slots counted by the low speed slot counter, and for outputting a request signal, respectively, when one of (a) the first count value counted by the high speed slot counter reaches a predetermined value and (b) the second count value counted by the low speed slot counter reaches the predetermined value; and a clock control section for outputting the control signal in accordance with the request signal.

2. The radio communication device as set forth in claim 1, further comprising:

a central control section, driven in accordance with the operation clock signal, for controlling the transmitting and receiving of data.

3. The radio communication device as set forth in claim 1, further comprising:

a time correcting section for comparing an expected current time and a current time, the current time is detected from the receiving signal, and then outputting a correct current time and a correction detecting signal to the request signal generating section, the request signal generating section corrects the first and second count values and outputs, according to the first and second count values thus corrected, the request signal for controlling the control signal.

4. The radio communication device as set forth in claim 1 wherein:

the period count section is so arranged that, in shifting from (i) a period in which transmitting and receiving are carried out, to (ii) a period in which no transmitting and receiving are carried out, the counting of the slots by the high speed slot counter is continued by the slow speed slot counter so that the first count value of the slots by the high speed slot counter is continued in the counting of the slots by the slow speed slot counter.

5. The radio communication device as set forth in claim 1, wherein:

when the first count value of the slots counted by the high speed slot counter reaches the predetermined value the request signal generating section outputs a request signal for shifting from (i) a period in which the transmitting and receiving are carried out, to (ii) a period in which no transmitting and receiving are carried out and when the second count value of the slots counted by the slow speed slot counter reaches the predetermined value the request signal generating section outputs a request signal for shifting from (i) a period in which no transmitting and receiving are carried out, to (ii) a period in which transmitting and receiving are carried out.

6. The radio communication device as set forth in claim 5, wherein:

the clock control section stops outputting the RF clock signal and the operation clock signal, and starts outputting the power-down clock signal, on receiving the request signal for shifting from (i) the period in which the transmitting and receiving are carried out, to (ii) the period in which no transmitting and receiving are carried out.

7. The radio communication device as set forth in claim 5, wherein:

the clock control section starts outputting the RF clock signal and the operation clock signal, and stops outputting the power-down clock signal, on receiving the request signal for shifting from (i) the period in which no transmitting and receiving are carried out, to (ii) the period in which the transmitting and receiving are carried out.

8. The radio communication device as set forth in claim 1, further comprising:

a communication slot counter for counting the slots in a period in which the transmitting and receiving are carried out, wherein, in ease the transmitting and receiving are carried out only in a certain transmitting and receiving period every predetermined number of cycles, (a) if data is received within the transmitting and receiving period or if data to be transmitted is written in the modulation/demodulation section within the transmitting and receiving period, the transmitting and receiving period is extended, by a predetermined length of time, from a time at which the receiving of data is completed, or from a time at which transmitting the data to be transmitted is completed, and (b) if no data is received within the certain transmitting and receiving period or if no data to be transmitted is written in the modulation/demodulation section within the transmitting and receiving period in which the transmitting and receiving are carried out, the transmitting and receiving period is ended without being extended, and the transmitting and receiving are stopped until a next timing at which the transmitting and receiving are resumed.

9. A method for controlling a radio communication device, comprising:

transmitting and receiving a radio signal by communicating with an external device while carrying data over radio waves;

modulating the radio signal before the transmitting and demodulating the radio signal after the receiving;

generating an RF clock signal, an operation clock signal, and a power-down clock signal, respectively, in accordance with a control signal, (i) the RF clock signal having a high frequency and serving as a reference for starting the transmitting and receiving, (ii) the operation clock signal being for normal operation, and serving as a reference for starting each step except the step of transmitting and receiving, and (iii) the power-down clock signal having a low frequency and being for reducing power consumption;

counting slots corresponding to a duration of a period for transmitting and receiving, by using a high speed slot counter driven in accordance with the operation clock signal thus generated in the step of generating the clock signals, and counting slots corresponding to a duration of a period for no transmitting and receiving, by using a low speed slot counter driven in accordance with the power down clock signal having a low frequency and being thus generated by the clock generating section;

receiving a first count value of the slot counted by the high speed slot counter and a second count value of slot counted by the low speed slot counter, and outputting a request signal respectively when one of the first and second count values reach a predetermined value; and outputting the control signal in accordance with the request signal, and controlling each clock signal.

10. The method as set forth in claim 9, further comprising the step of:

transmitting and receiving data by using a central controlling section driven in accordance with the operation clock signal for normal operation.

11. The method as set forth in claim 9, further comprising the step of:

comparing an expected current time and a current time, the current time is detected from the receiving signal, and then outputting a correct current time and a correction detecting signal, so that in the step of generating the request signal, (i) the correct current time and the correction detecting signal are inputted, (ii) the first and second count values are corrected, and (iii) the request signal for controlling the control signal is outputted according to the first and second count values thus corrected.

12. The method as set forth in claim 9, wherein:

the step of counting is carried out such that, in shifting from (i) a period in which the transmitting and receiving are carried out to (ii) a period in which no transmitting and receiving are carried out, the counting of the slots by the high speed slot counter is continued by the slow speed slot counter so that the first count value of the slots by the high speed slot counter is continued in the counting of the slots by the slow speed slot counter.

13. The method as set forth in claim 9, wherein:

when the first count value of the slots counted by the high speed slot counter reaches the predetermined value a request signal for shifting from a period in which the transmitting and receiving are carried out to a period in which no transmitting and receiving are carried out is output and when the second count value of the slots counted by the slow speed slot counter reaches the predetermined value a request signal for shifting from a period in which no transmitting and receiving are carried out to a period in which transmitting and receiving are carried out is output.

14. The method as set forth in claim 13, wherein:

outputting the RF clock signal and the operation clock signal is stopped, and outputting the power-down clock signal is started, on receiving the request signal for shifting from the period in which the transmitting and receiving are carried out to the period in which no transmitting and receiving are carried out.

15. The methods set forth in claim 13, wherein:

outputting the RF clock signal and the operation clock signal is stopped, and outputting the power-down clock signal is started, on receiving the request signal for shifting from the period in which no transmitting and receiving are carried out, to (ii) the period in which the transmitting and receiving are carried out.

16. The method as set forth in claim 9 further wherein:

in case the transmitting and receiving are carried out only in a certain transmitting and receiving period every predetermined number of cycles, if data is received within the transmitting and receiving period or if data to be transmitted is written in the modulation/demodulation section within the transmitting and receiving period, the transmitting and receiving period is extended, by a predetermined length of time, from a time at which the receiving of data is completed, or from a time at which transmitting the data to be transmitted is completed.

17. A radio communication device in which a communication permitting period, in which communication with an external device is permitted by carrying data over radio waves, and a non-communication period different from the communication permitting period are set, comprising:

a clock generating section for generating, respectively, in accordance with a control signal, a first clock signal for the communication-permitting period, and a second clock signal for the non-communication period;

a first counter for counting the first clock signal, for control of the communication-permitting period;

a second counter for counting the second clock signal, for control of the non-communication period; and a clock control section for outputting the control signal in accordance with a first count value of the first counter and a second count value of the second counter, and causing the first counter and the second counter to count the first and second count values continuously, respectively;

wherein the communication permitting period is extended by a predetermined number of slots, when transmitting/receiving of data is actually being performed in the communication permitting period.

18. A radio communication device in which a communication permitting period, in which communication with an external device is permitted by carrying data over radio waves, and a non-communication period different from the communication permitting period are set, comprising:

a first counter for counting a first clock signal, for control of the communication permitting period;

a second counter for counting a second clock signal, for control of the non-communication period;

a clock control section for outputting a control signal in accordance with a first count value of the first counter and a second count value of the second counter, and causing the first counter and the second counter to count the first and second count values continuously, respectively;

a communication slot counter which starts counting a number of slots during a period from a start of the communication permitting period until transmitting/receiving of data is actually performed; and transmission/receiving control means that forces the communication permitting period to end when the count value of the communication slot counter reaches a predetermined value.

* * * * *